US011252263B2

(12) United States Patent
Guimaraes et al.

(10) Patent No.: US 11,252,263 B2
(45) Date of Patent: Feb. 15, 2022

(54) METHOD AND APPARATUS FOR EFFICIENT COMMUNICATION PACKET GENERATION IN INTERNET OF THINGS (IOT)

(71) Applicant: The Regents of the University of California, Oakland, CA (US)

(72) Inventors: Vinicius Galvao Guimaraes, Santa Cruz, CA (US); Katia Obraczka, Santa Cruz, CA (US); Adolfo Bauchspiess, Santa Cruz, CA (US); Renato Mariz de Moraes, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/914,778

(22) Filed: Jun. 29, 2020

(65) Prior Publication Data
US 2020/0412843 A1    Dec. 31, 2020

Related U.S. Application Data

(60) Provisional application No. 62/874,358, filed on Jul. 15, 2019, provisional application No. 62/868,671, filed on Jun. 28, 2019.

(51) Int. Cl.
*H04L 29/06* (2006.01)
*H04W 28/02* (2009.01)
*H04L 12/861* (2013.01)

(52) U.S. Cl.
CPC .............. *H04L 69/16* (2013.01); *H04L 49/90* (2013.01); *H04L 69/22* (2013.01); *H04W 28/0278* (2013.01)

(58) Field of Classification Search
CPC ........ G06F 9/505; G06F 9/546; G06F 9/5044; G06F 13/28; H04L 49/90; H04L 69/16; H04L 69/22; H04W 76/25
(Continued)

(56) References Cited

U.S. PATENT DOCUMENTS

2010/0287456 A1\* 11/2010 Chang ..................... H04L 69/22
 714/807
2013/0007484 A1\* 1/2013 Gobriel ................. H04W 76/25
 713/320
(Continued)

OTHER PUBLICATIONS

Akyildiz, et al., "A Cross-Layer Protocol for Wireless Sensor Networks," in Proceedings of the 2006 40th Annual Conference on Information Sciences and Systems Princeton, NJ, USA: IEEE, Mar. 2006, pp. 1102-1107.
(Continued)

*Primary Examiner* — Harun Chowdhury
(74) *Attorney, Agent, or Firm* — Wolter Van Dyke Davis, PLLC; Eugene J. Molinelli

(57) ABSTRACT

Techniques for efficient communication packet generation in internet of things (IOT) include presenting an application programming interface to each of a plurality of protocols in a plurality of different layers of a network communications protocol stack. A single packet buffer is configured in memory to hold headers for all of the plurality of protocols for a packet directed to a first destination node. Pointers are also stored in memory to tables maintained by the plurality of protocols. In response to receiving input at the application programming interface from a first protocol, at least one bit is updated in the single packet buffer based on the input and on data in a table maintained by a different second protocol of the plurality of protocols.

7 Claims, 17 Drawing Sheets

(58) Field of Classification Search
USPC .......................... 370/392, 469, 474; 714/807
See application file for complete search history.

(56) References Cited

U.S. PATENT DOCUMENTS

2019/0179697 A1* 6/2019 Horio ..................... G06F 13/28
2019/0303209 A1* 10/2019 Pope ....................... G06F 9/505

OTHER PUBLICATIONS

Babber, et al., "A Cross-Layer Optimization Framework for Energy Efficiency in Wireless Sensor Networks," Wireless Sensor Network, vol. 09, No. 06, pp. 189-203, 2017.
Chakrabarti, et al., "Ipv6 over low-power wireless personal area network (6lowpan) esc dispatch code points and guidelines," Feb. 2017.
Deering, et al., "Internet protocol, version 6 (ipv6) specification," Dec. 1998.
Dunkels, et al., "An adaptive communication architecture for wireless sensor networks," in Proceedings of the 5th international conference on Embedded networked sensor systems—SenSys '07. Sydney, Australia: ACM Press, 2007, pp. 335-349.
Dunkels, "The contikimac radio duty cycling protocol," SICS Technical Report T2011:13, 2011.
Fu, et al., "A survey of cross-layer designs in wireless networks," IEEE Communications Surveys and Tutorials, vol. 16, No. 1, pp. 110-126, 2014.
Lachenmann, et al., "TinyXXL: Language and runtime support for cross-layer interactions," in Proceedings of the 2006 3rd Annual IEEE Communications Society on Sensor and Adhoc Communications and Networks, Secon 2006, vol. 1, Reston, VA, USA, 2007, pp. 178-187.
Levis, et al., "TinyOS: An operating system for sensor networks," in Weber W., Rabaey J.M., Aarts E. (eds) Ambient intelligence. Berlin, Heidelberg: Springer, 2005, pp. 115-148.

Madani, et al., "A Step towards Standardization of Wireless Sensor Networks: A Layered Protocol Architecture Perspective," in Proceedings of the 2007 International Conference on Sensor Technologies and Applications (SENSORCOMM 2007). Valencia, Spain: IEEE, Oct. 2007, pp. 82-87.
Marrón, et al., "Tiny—Cubus: An Adaptive Cross-Layer Framework for Sensor Networks (TinyCubus: Ein Adaptives Cross-Layer Framework f ur Sensornetze)," it—Information Technology, vol. 47, No. 2, Jan. 2005.
Mendes, et al., "A survey on cross-layer solutions for wireless sensor networks," Journal of Network and Computer Applications, vol. 34, No. 2, pp. 523-534, 2011.
MoteIV, "Tmote sky—Low Power Wireless Sensor Module."
Österlind,, et al., "Crosslevel sensor network simulation with COOJA," in Proceedings of the Conference on Local Computer Networks, LCN. IEEE, 2006, pp. 641-648.
Österlind, et al., "Integrating building automation systems and wireless sensor networks," in Proceedings of the 2007 IEEE Conference on Emerging Technologies & Factory Automation (EFTA 2007), Patras, Greece, 2007, pp. 1376-1379.
Palattella,, et al., "Standardized protocol stack for the internet of (important) things," IEEE Communications Surveys and Tutorials, vol. 15, No. 3, pp. 1389-1406, 2013.
Parasuram, et al., "An Analysis of the RPL Routing Standard for Low Power and Lossy Networks," Technical Report No. UCB/EECS-2016-106, p. 98, 2016.
Roussel, et al., "A critical analysis of Contiki's network stack for integrating new MAC protocols," Ph.D. dissertation, INRIA Nancy, 2015.
Solis, et al., "FLIP: A Flexible Interconnection Protocol for heterogeneous internetworking," Mobile Networks and Applications, vol. 9, No. 4, pp. 347-361, 2004.
Webopedia, "The 7 layers of the OSI Model."
Wikipedia, "AA battery."
Wikipedia, "Advanced Package Tool."
Winter, et al., "Rpl: Ipv6 routing protocol for low-power and lossy networks," Mar. 2012.

* cited by examiner

METHOD AND APPARATUS FOR EFFICIENT COMMUNICATION PACKET GENERATION IN INTERNET OF THINGS (IOT)

CROSS-REFERENCE TO RELATED APPLICATIONS

This application claims benefit, under 35 U.S.C. § 119(e), of Provisional Appln. 62/868,671, filed Jun. 28, 2019 and of Provisional Appln. 62/874,358, filed Jul. 15, 2019, the entire contents of each of which are hereby incorporated by reference as if fully set forth herein.

STATEMENT OF GOVERNMENTAL INTEREST

This invention was made with government support under Contract No. CNS 1321151 awarded by the National Science Foundation. The government has certain rights in the invention.

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header, a transport (layer 4) header and an application (layer 5) header (followed by a layer 5 payload), as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. Some network layer addresses, including IP addresses are hierarchical and can be aggregated. Hierarchical addresses are organized into numerous groups and subgroups and subgroups of subgroups, etc. Each layer of subgroups successively narrow the address space until at, the finest level of granularity of the address space, a single element of the network is indicated (e.g., a network interface card on a network node). A group address aggregates the addresses in the subgroups of that group.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). In a link-state protocol, two routers establish an adjacency relationship between them by first verifying direct two-way communication between them over the same network segment and then synchronizing their link-state databases. Link-state data describe all links to a router and describes the network addresses reachable on each of those links, as well as other properties of the link. Once the adjacency relationship is established, the two routers are called peers. During a reliable flooding stage of a link-state protocol, each router is required to ensure that each of its peers has received the link-state data describing the router's own links.

As a consequence, resources on each router and many other network nodes are consumed for each set of addresses associated with each link. The resources consumed by the router include: memory to store the addresses associated with each link; processor time to compute a route based, at least in part, on the addresses reachable over each link; and both processor time and link bandwidth for sending, receiving and processing routing information involving the link. As the size of a network increases, the consumption of network resources also increases, interfering with the capacity of the protocol to scale up to a network with a large numbers of nodes. The capacity for a network protocol to scale up to a network with a large number of nodes is called the scalability of the protocol.

SUMMARY

Techniques are provided for efficient communication packet generation in internet of things (IOT) nodes, which are often hampered by reduced processing power, bandwidth, or energy supply, or some combination. The techniques are hereinafter collectively referenced as Internet of Things Unified Services (IoTUS).

In a first set of embodiments, a method includes presenting an application programming interface to each of multiple protocols in multiple different layers of a network communications protocol stack. The method includes preserving in memory a single packet buffer configured to hold headers for all of the protocols for a packet directed to a first destination node. The method still further includes storing in memory pointers to tables maintained by the multiple protocols. In response to receiving input at the application programming interface from a first protocol, the method even further includes updating at least one bit in the single packet buffer based on the input and on data in a table maintained by a different second protocol of the multiple protocols.

In some embodiments of the first set, the application programming interface is inserted into code for each protocol of the plurality of protocols during compilation of instructions for the protocol stack, whereby original instructions for the protocol stack may be compiled with instructions for the method.

In some embodiments of the first set, updating the at least one bit includes aggregating data for the first protocol into the packet directed to the first destination node previously constructed for the second protocol. In some of these embodiments, aggregating data for the first protocol includes indicating a keep alive message for the first protocol.

In some embodiments of the first set, the packet directed to the first destination node is a layer 5 application data packet. In other embodiments of the first set, the packet directed to the first destination node is a control packet for layer 2 or layer 3 or layer 4.

In other sets of embodiments, a non-transitory computer-readable medium, or an apparatus or a system is configured to perform one or more steps of the above method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

The invention was also partly supported by the Brazilian Government through its research funding agencies CAPES and CNPq.

BRIEF DESCRIPTION OF THE DRAWINGS

Embodiments are illustrated by way of example, and not by way of limitation, in the figures of the accompanying drawings, in which like reference numerals refer to similar elements; and, in which.

DETAILED DESCRIPTION

A method and apparatus are described for efficient communication packet generation in internet of things (IoT). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Although embodiments are described below in the context of low capacity devices such as nodes in an Internet of Things (IoT), embodiments of the invention are not limited to this context. In other embodiments, similar techniques are used in wired and wireless, fixed or mobile or ad hoc mobile, networks with nodes of greater computing power, bandwidth and energy capacity.

1. STANDARD STRUCTURES

Figure 1:
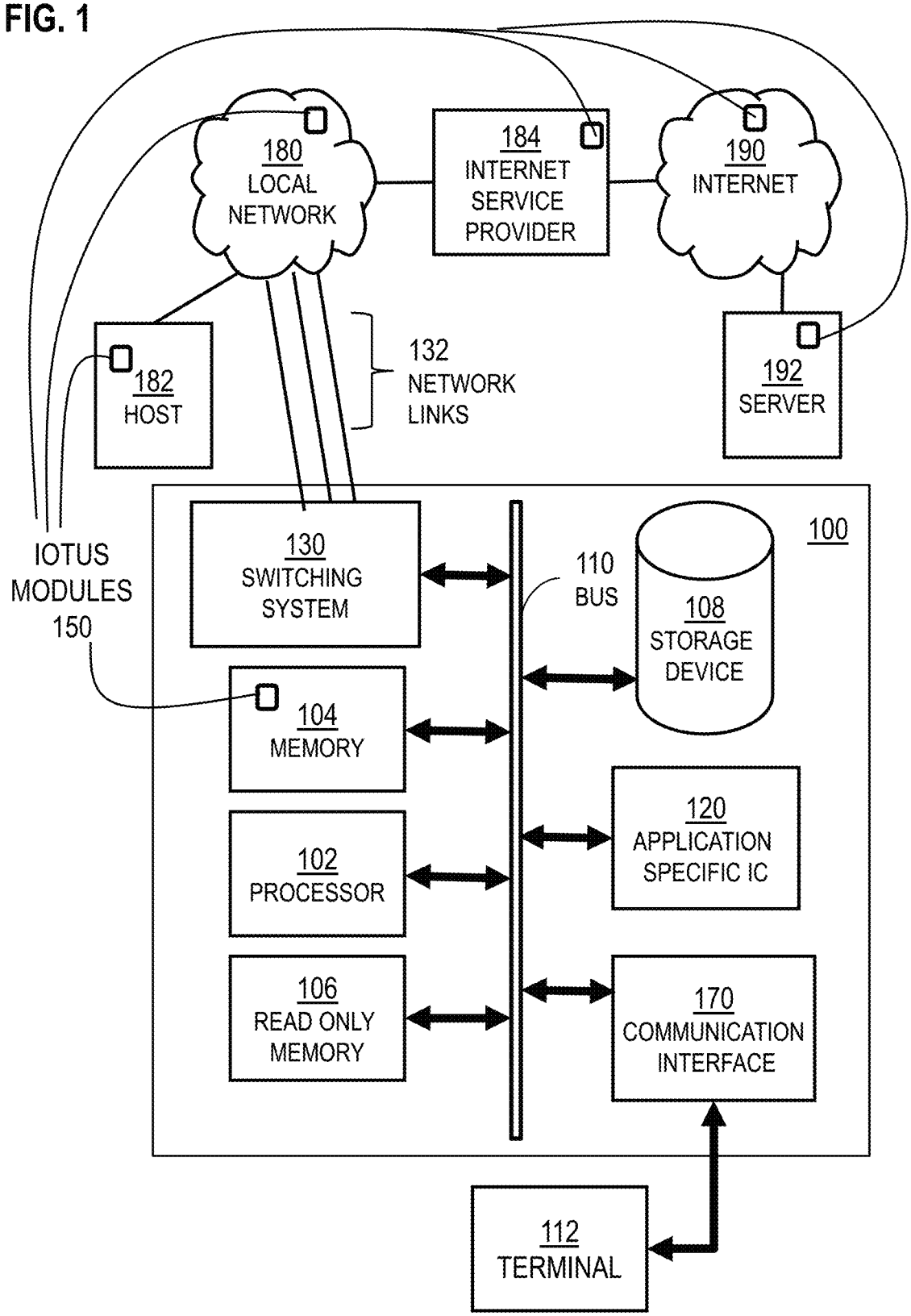
FIG. 1 is a block diagram that illustrates a computer system upon which an embodiment of the invention may be implemented.

FIG. 1 is a block diagram that illustrates a computer system 100 upon which an embodiment of the invention may be implemented. The Internet of Things Unified Services (IoTUS). modules 150 are depicted on each of several computer system nodes. Computer system 100 includes a communication mechanism such as a bus 110 for passing information between other internal and external components of the computer system 100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 100, or a portion thereof, constitutes a means for performing one or more steps of one or more methods described herein.

A sequence of binary digits constitutes digital data that is used to represent a number or code for a character. A bus 110 includes many parallel conductors of information so that information is transferred quickly among devices coupled to the bus 110. One or more processors 102 for processing information are coupled with the bus 110. A processor 102 performs a set of operations on information. The set of operations include bringing information in from the bus 110 and placing information on the bus 110. The set of operations also typically include comparing two or more units of information, shifting positions of units of information, and combining two or more units of information, such as by addition or multiplication. A sequence of operations to be executed by the processor 102 constitutes computer instructions.

Computer system 100 also includes a memory 104 coupled to bus 110. The memory 104, such as a random access memory (RAM) or other dynamic storage device, stores information including computer instructions. Dynamic memory allows information stored therein to be changed by the computer system 100. RAM allows a unit of information stored at a location called a memory address to be stored and retrieved independently of information at neighboring addresses. The memory 104 is also used by the processor 102 to store temporary values during execution of computer instructions. The computer system 100 also includes a read only memory (ROM) 106 or other static storage device coupled to the bus 110 for storing static information, including instructions, that is not changed by the computer system 100. Also coupled to bus 110 is a non-volatile (persistent) storage device 108, such as a magnetic disk, optical disk, or FLASH-EPROM, for storing information, including instructions, that persists even when the computer system 100 is turned off or otherwise loses power.

Information, including instructions, is provided to the bus 110 for use by the processor from an external input device 112, such as a keyboard containing alphanumeric keys operated by a human user, or a sensor. A sensor detects conditions in its vicinity and transforms those detections into signals compatible with the signals used to represent information in computer system 100. Other external devices coupled to bus 110, used primarily for interacting with humans, include a display device 114, such as a cathode ray tube (CRT) or a liquid crystal display (LCD), for presenting images, and a pointing device 116, such as a mouse or a trackball or cursor direction keys, for controlling a position of a small cursor image presented on the display 114 and issuing commands associated with graphical elements presented on the display 114.

In the illustrated embodiment, special purpose hardware, such as an application specific integrated circuit (IC) 120, is coupled to bus 110. The special purpose hardware is configured to perform operations not performed by processor 102 quickly enough for special purposes. Examples of application specific ICs include graphics accelerator cards for generating images for display 114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 100 includes switching system 130 as special purpose hardware for switching information flow over a network. Switching system 130 typically includes multiple communications interfaces, such as communications interface 170, for coupling to multiple other devices. In general, each coupling is with a network link 132 that is connected to another device in or attached to a network, such as local network 180 in the illustrated embodiment, to which a variety of external devices with their own processors are connected. In some embodiments an input interface or an output interface or both are linked to each of one or more external network elements. Although three network links 132a, 132b, 132c are included in network links 132 in the illustrated embodiment, in other embodiments, more or fewer links are connected to switching system 130. Network links 132 typically provides information communication through one or more networks to other devices that use or process the information. For example, network link 132b may provide a connection through local network 180 to a host computer 182 or to equipment 184 operated by an Internet Service Provider (ISP). ISP equipment 184 in turn provides data communication services through the public, world-wide packet-switching communication network of networks now commonly referred to as the Internet 190. A computer called a server 192 connected to the Internet provides a service in response to information received over the Internet. For example, server 192 provides routing information for use with switching system 130.

The switching system 130 includes logic and circuitry configured to perform switching functions associated with passing information among elements of network 180, including passing information received along one network link, e.g. 132a, as output on the same or different network link, e.g., 132c. The switching system 130 switches information traffic arriving on an input interface to an output interface according to pre-determined protocols and conventions that are well known. In some embodiments, switching system 130 includes its own processor and memory to perform some of the switching functions in software. In some embodiments, switching system 130 relies on processor 102, memory 104, ROM 106, storage 108, or some combination, to perform one or more switching functions in software. For example, switching system 130, in cooperation with processor 104 implementing a particular protocol, can determine a destination of a packet of data arriving on input interface on link 132a and send it to the correct destination using output interface on link 132c. The destinations may include host 182, server 192, other terminal devices connected to local network 180 or Internet 190, or other routing and switching devices in local network 180 or Internet 190.

Computer system 100 also includes one or more instances of a communications interface 170 coupled to bus 110. Communication interface 170 provides a two-way communication coupling to a variety of external devices that operate with their own processors, such as printers, scanners and external disks. In general the coupling is with a network link 132 that is connected to a local network 180 to which a variety of external devices with their own processors are connected. For example, communication interface 170 may be a parallel port or a serial port or a universal serial bus (USB) port on a personal computer. In some embodiments, communications interface 170 is an integrated services digital network (ISDN) card or a digital subscriber line (DSL) card or a telephone modem that provides an information communication connection to a corresponding type of telephone line. In some embodiments, a communication interface 170 is a cable modem that converts signals on bus 110 into signals for a communication connection over a coaxial cable or into optical signals for a communication connection over a fiber optic cable. As another example, communications interface 170 may be a local area network (LAN) card to provide a data communication connection to a compatible LAN, such as Ethernet. As another example, communications interface 170 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 170 sends and receives electrical, acoustic or electromagnetic signals, including infrared and optical signals, that carry information streams, such as digital data.

The term computer-readable medium is used herein to refer to any medium that participates in providing information to processor 102, including instructions for execution. Such a medium may take many forms, including, but not limited to, non-volatile media, volatile media and transmission media. Non-volatile media include, for example, optical or magnetic disks, such as storage device 108. Volatile media include, for example, dynamic memory 104. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 102, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 102, except for carrier waves and other signals.

Logic encoded in one or more tangible media includes one or both of processor instructions on a computer-readable storage media and special purpose hardware, such as ASIC 120.

The invention is related to the use of computer system 100 for implementing the techniques described herein. According to one embodiment of the invention, those techniques are performed by computer system 100 in response to processor 102 executing one or more sequences of one or more instructions contained in memory 104. Such instructions, also called software and program code, may be read into memory 104 from another computer-readable medium such as storage device 108. Execution of the sequences of instructions contained in memory 104 causes processor 102 to perform the method steps described herein. In alternative embodiments, hardware, such as application specific integrated circuit 120, may be used in place of or in combination with software to implement the invention. Thus, embodiments of the invention are not limited to any specific combination of hardware and software.

The signals transmitted over network link 132 and other networks through communications interface 170, carry information to and from computer system 100. Computer system 100 can send and receive information, including program code, through the networks 180, 190 among others, through network link 132 and communications interface 170. In an example using the Internet 190, a server 192 transmits program code for a particular application, requested by a message sent from computer 100, through Internet 190, ISP equipment 184, local network 180 and communications interface 170. The received code may be executed by processor 102 as it is received, or may be stored in storage device 108 or other non-volatile storage for later execution, or both. In this manner, computer system 100 may obtain application program code in the form of a signal on a carrier wave.

Various forms of computer readable media may be involved in carrying one or more sequence of instructions or data or both to processor 102 for execution. For example, instructions and data may initially be carried on a magnetic disk of a remote computer such as host 182. The remote computer loads the instructions and data into its dynamic memory and sends the instructions and data over a telephone line using a modem. A modem local to the computer system 100 receives the instructions and data on a telephone line and uses an infra-red transmitter to convert the instructions and data to a signal on an infra-red a carrier wave serving as the network link 132. An infrared detector serving as communications interface 170 receives the instructions and data carried in the infrared signal and places information representing the instructions and data onto bus 110. Bus 110 carries the information to memory 104 from which processor 102 retrieves and executes the instructions using some of the data sent with the instructions. The instructions and data received in memory 104 may optionally be stored on storage device 108, either before or after execution by the processor 102.

Although processes, equipment, and data structures are depicted as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2A:
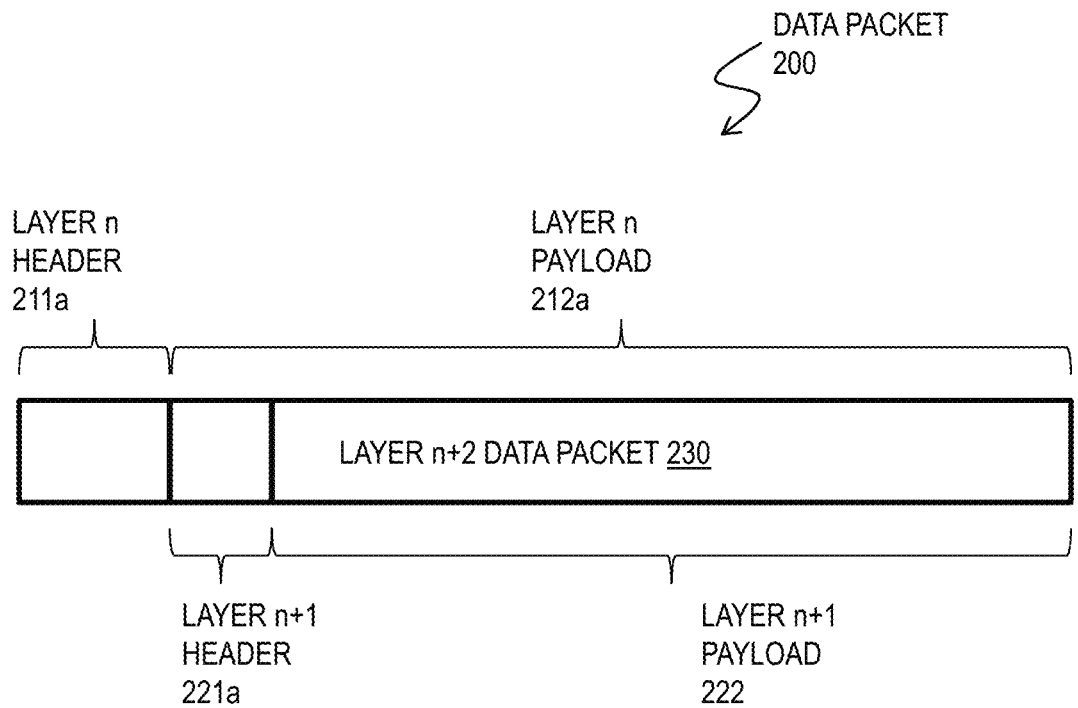
FIG. 2A is a block diagram that illustrates an example data packet 200 with data provided for higher layer protocol.

FIG. 2A is a block diagram that illustrates an example data packet 200 with data provided for a higher layer protocol, such as an Internet protocol (IP). Such data packets 200 include an nth layer (Layer n, such as physical layer 1) header 211a made up of a series of bits that indicate values for various Layer n fields, and a Layer n payload 212a. The Layer n payload 212a includes a Layer n+1 header 221a that is made up of a series of bits that indicate values for various Layer n+1 fields, and a Layer n+1 payload 222. The Layer n+1 payload 222 includes a series of bits that indicate values for the various fields of the header and payload of the higher layer protocols encapsulated by the Layer n+1 protocol, such as a layer n+2 data packet.

Figure 2B:
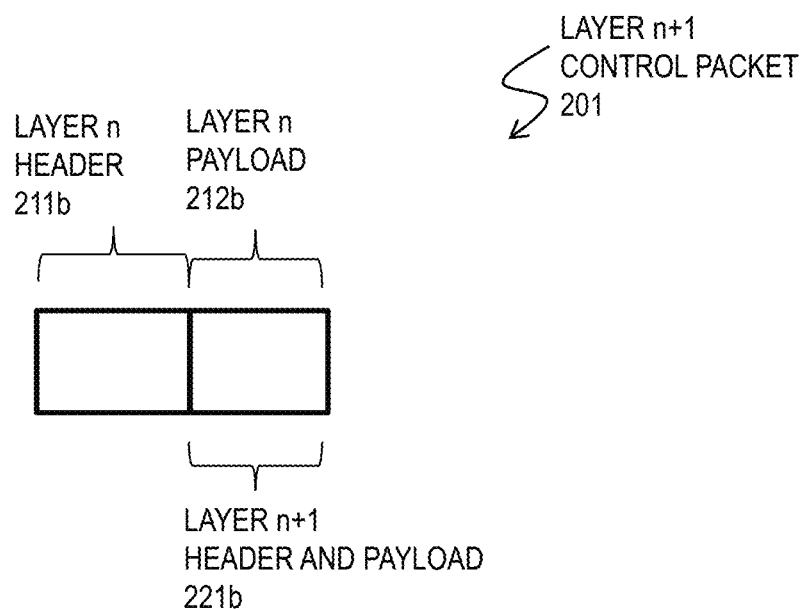
FIG. 2B is a block diagram that illustrates an example control plane packet 201 for the Layer n+1 protocol.

FIG. 2B illustrates an example control plane packet 201 for the Layer n+1 protocol. As for the data packet 200, the control plane packet 201 includes a Layer n header 211b and Layer n payload 212b. However here, the Layer n payload only includes a header and payload for Layer n+1 and no higher layer protocols. This kind of packet is used to communicate information just used by the Layer n+1 protocol, such as any handshaking negotiation or acknowledgment that a data packet was successfully delivered over the shared channel, called an acknowledgement message (ACK). An ACK uniquely identifies the data packet being acknowledged, e.g., with a unique identifier in an ID field, not shown, in the Layer n+1 header 221b of the control packet 201 that matches the unique identifier in the ID field, not shown, in the Layer n+1 header 221a of the data packet 200.

Figures 2C, 2D:
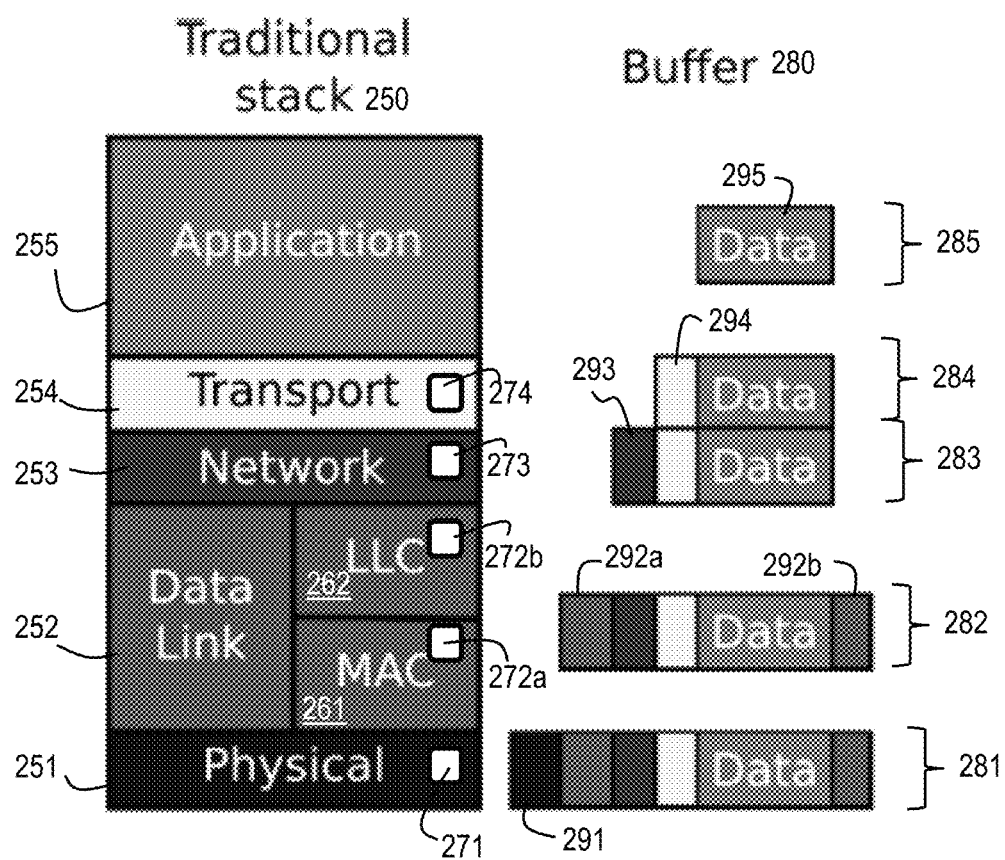
FIG. 2C is a block diagram that illustrates an example protocol stack for an application layer (Layer 5)
FIG. 2D is a block diagram that illustrates example buffers maintained by the protocol stack of FIG. 2C for a single data packet.

FIG. 2C is a block diagram that illustrates an example protocol stack 250 for an application layer (Layer 5) 255. The stack includes: a physical layer (layer 1) protocol module 251 including one or more tables 271 of physical state data; a data link layer (layer 2) protocol module 252 including one or more tables 271 of physical state data; a physical layer (layer 1) protocol module 251 including one or more tables 272a and table 272b of link state data, e.g., in a media access control MAC sublayer 261 and a logical link control (LLC) sublayer 262; a network layer (layer 3) protocol module 253 including one or more routing tables 273 of network routing data; a transport layer (layer 4) protocol module 254 including one or more tables 274 of transport state data, such as packet sequence information; and, an application module 255, such as a browser, generating and consuming data sent over the network.

FIG. 2D is a block diagram that illustrates example buffers maintained by the protocol stack of FIG. 2C for a single data packet. During operation, when a data packet is generated for transmission over the network, the application module 255 produces data 295 to transmit and stores it in memory locations under its control represented by buffer 285. This data is passed to the transport module 254 which adds a transport layer header 294 and stores the expanded packet in a new buffer 284 under the control of the transport module 254, duplicating the storage of data 295. Similarly, the network layer module 253 adds network layer header 293 and stores the expanded packet in a new buffer 283 under the control of the network module 253, duplicating the storage of data 295 and header 294. The data link layer module 252 adds data link layer header 292a and trailer 292b and stores the expanded packet in a new buffer 282 under the control of the network module 252, duplicating the storage of data 295 and header 294 and header 293. Finally, the physical layer module 251 adds physical layer header 291 and stores the expanded packet in a new buffer 281 under the control of the physical layer module 251, duplicating the storage of data 295, header 294, header 293, header 292a and trailer 292b. The buffers 281 through 285, collectively called buffers 280, are repeated for each different data packet simultaneously being processed by the current node.

Figure 3A:
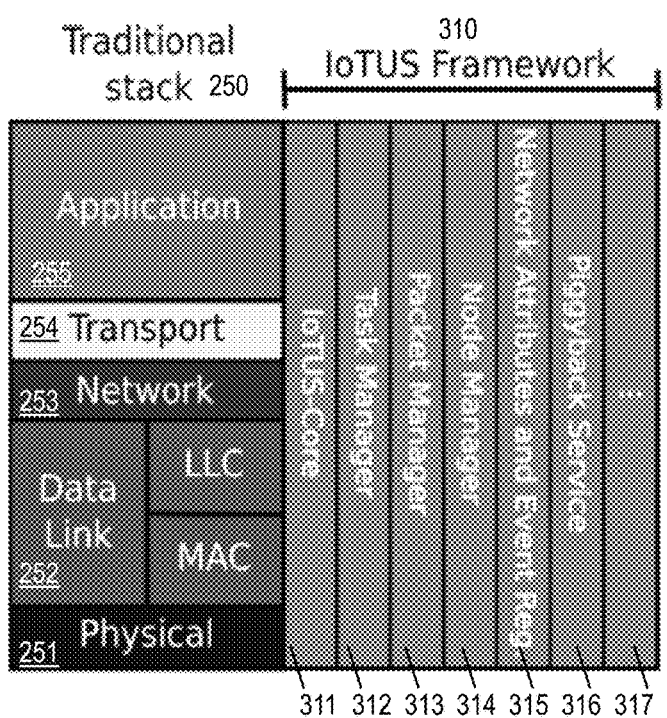
FIG. 3A is a block diagram that illustrates an example protocol stack for an application layer (Layer 5) with an Internet of Things Unified Services (IoTUS) framework, according to an embodiment.
Figure 3B:
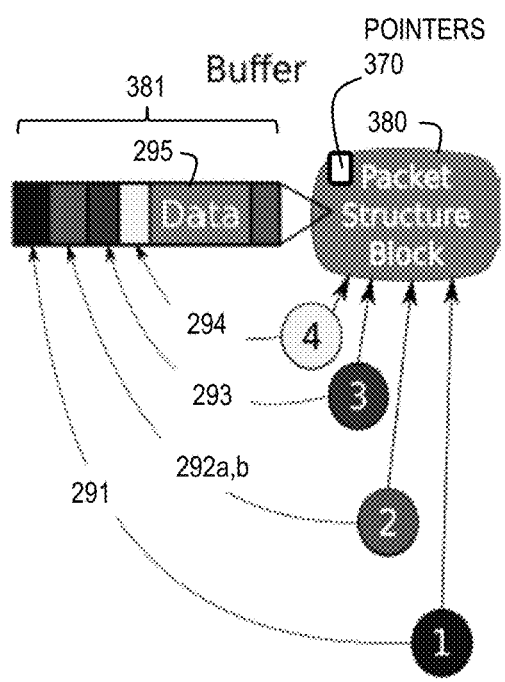
FIG. 3B is a block diagram that illustrates a single data packet buffer maintained by the IoTUS framework of FIG. 3A, according to an embodiment.

Although data structures, modules, messages and fields are depicted in FIG. 2A and FIG. 2B, and subsequent drawings such as FIG. 3A and FIG. 3B, as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

2. OVERVIEW

The techniques presented here promote information and functionality sharing across protocol layers while maintaining the benefits of a layered design. Through efficient cross-layer sharing, radio energy efficiency is achieved, as well as a more compact memory footprint, both of which are important to accommodate IoT devices with limited capabilities. As illustrated here, these techniques are designed as a collection of service modules which can be used by existing protocol stacks without the need to modify their protocols' design. In general, protocols dictate how information appears in a packet, but the software to generate and process the packet can be implemented in any manner. Here the manner involves a set of modules that can be accessed through application programming interfaces (APIs) inserted during compilation. The modules share memory and information among the different protocols. In a particular embodiment, the modules are configured so that keep alive control messages for several different protocols to the same network address are combined in a single message.

FIG. 3A is a block diagram that illustrates an example protocol stack 250 for an application layer (Layer 5) with IoTUS framework 310, according to an embodiment. The standard application stack 250 is as depicted in FIG. 2A; but, during compilation some function calls are replaced with calls to the API of the IoTUS framework 310 comprising one or more IoTUS modules 150. The IoTUS framework 310 replaces the simple packet buffer and queue API of the ContikiOS' Rime stack. In the illustrated embodiment, the IoTUS framework 310 includes multiple modules accessed through the API and presented as parallel vertical blocks, including: a Core module 311, a Task Manager module 312, A Packet Manager module 313, a Node Manager module 314; a Network Attributes and Event Register module 315; and, a Piggyback Service module 316; among others indicated by ellipsis 317.

FIG. 3B is a block diagram that illustrates a single data packet buffer 381 maintained by the IoTUS framework of FIG. 3A, according to an embodiment. The modules of the IoTUS framework 310 all have access to the same packet data structure block 380 in memory. Thus the packet manager 313, at least, preserving in memory a single packet buffer configured to hold headers for all of the plurality of protocols for a packet directed to a first destination node.

This packet structure block includes a pointers data structure 370 that points to the various tables (271, 272a, 272b, 273, 274) maintained by the traditional stack 250. In some embodiments, the pointers data structure also maintains a compact version of the state of the neighbors, connections, and paths through the network, which are used to populate the tables 271, 272a, 272b, 273 and 274, respectively, maintained by each protocol in the traditional stack 250. Thus, in at least some embodiments, the IoTUS framework 310 stores in memory pointers to tables maintained by the plurality of protocols.

The block 380 also includes a single buffer 381 for each data packet to be processed (wherein processed means constructed for transmission, or deconstructed upon receipt, or both). Compare the memory footprint of the single buffer 381 with the multiple buffers 281 through 285 utilized by the traditional stack 250 for a single packet to be processed. No data is stored repeatedly by buffer 381 as is done in buffers 281 through 285; thus, saving memory space that is valuable on a limited memory device often deployed in an IoT network. Several packets can be processed simultaneously by maintaining different single buffers 281 for each packet. Because several packets are processed simultaneously, it is also possible for the IoTUS framework to aggregate data for several different layers' control messages that are all headed to the same intermediate or end nodes, as is described in more detail below with respect to the Piggyback module 316.

IoTUS-Core module 311 is the main module and is used both during compilation and runtime. For the compilation process, IoTUS-Core module 311 (also called IoTUS-Core 311 hereinafter) processes each protocol in the stack and includes calls to the API for IoTUS' modules as appropriate for the functions of the protocols in the traditional stack. IoTUS modules can rely on other IoTUS modules, e.g., larger functions or services can be split into smaller functions, and just the service needed is inserted into any protocol. This dependence management is also taken care by IoTUS-Core 311. At runtime, IoTUS-Core 311 starts every other module of the IoTUS framework 310 using the information gathered at the compilation stage.

Some modules are heavily used for the framework 310 operation, like: Node Manager module 314; Task Manager module 312, and Packet Manager module 313 (also called Node Manager 314; Task Manager 312, and Packet Manager 313, hereinafter). Node Manager 314 maintains information about the node's neighbors such as addresses, ranking in the routing tree, link layer sequence number, link quality (RSSI), etc. The Packet Manager 313 module provides functions to build packets in single buffers 381. Node Manager 314 and Packet Manager 313 can be used by any layer of the protocol stack when they are adding, removing, or changing fields in their respective transmission units (e.g., packets at the network layer, frames at the data link layer, etc). The Task Manager 312 assigns the control of a module to protocols, thus ensuring synchronization between IoTUS modules and protocols.

Other modules are optional; and, their utilization depends on the protocol's functional needs. For example, the Piggyback Service module 316 (also called Piggyback Service 316 hereinafter) provides a data aggregation mechanism that can be used by protocols at different layers. Piggybacking helps achieve energy efficiency by including as many control plane functions as advantageous into the various layer headers of a single packet. Network Attributes and Event Register module 315 (also called Network Attributes and Event Reg. 315, hereinafter) concentrates information about many general network values, e.g., number of transmissions, connection quality, package drop rate, and others.

In addition to application-layer messages, keep-alive (KA) control messages are periodically generated by nodes to the data sink. In a stack for most existing networks, packets are built based on an array of bytes, in which headers are added to the payload as packets are processed by each layer on their way down the stack. In IoTUS, each protocol uses information maintained by Node Manager 314 to build a packet using the Packet Manager 313. During this step, additional information can also be added to the packet, such as timeout, priority, fragmentation/aggregation, etc. After the protocol finishes handling this packet, it sends a signal to the next layer carrying the packet's metadata. In this way, every field added to the packet has a globally known format, readable across different protocols. In the example shown in FIG. 3B, the application layer starts to build a packet and signals the network layer when it is done. The network layer evaluates the information already inserted in this packet block created by the application and inserts more processed data and header, then sending a signal to the next layer as well.

In addition, because the process of managing packets across layers is done using a centralized module, i.e., the Packet Manager 313, other modules such as Piggyback Service 316 can use the outgoing packet to aggregate information from other layers. For example, in the case of an application message being built to be transmitted, a KA control packet can be piggybacked, which results in improve network efficiency.

As previously discussed, besides facilitating information sharing across layers, IoTUS framework 310 also allows sharing of services (e.g., neighbor discovery, tree manager services, which are responsible for discovering information about a node's neighbors and maintaining a routing tree, respectively). The control of the sending packets is assigned by Task Manager 312; but, other protocols aware of this module's operation can aggregate their requests, and therefore reduce overhead and/or improve connection speed.

IoTUS was developed to improve energy consumption by allowing protocols to synchronize and/or aggregate their procedure and thus reduce the consumption of energy, for example, due to excessive radio transmissions. Hence, with more protocols and more complex tasks, it is expected that better memory usage, code reduction and network lifetime in general. However, IoTUS comes at the cost of processing time and an initial additional code. This processing cost caused by IoTUS framework can increase CPU consumption, but the energy saved in radio operations is expected to cause a greater cost impact on the overall network consumption.

Figure 4:
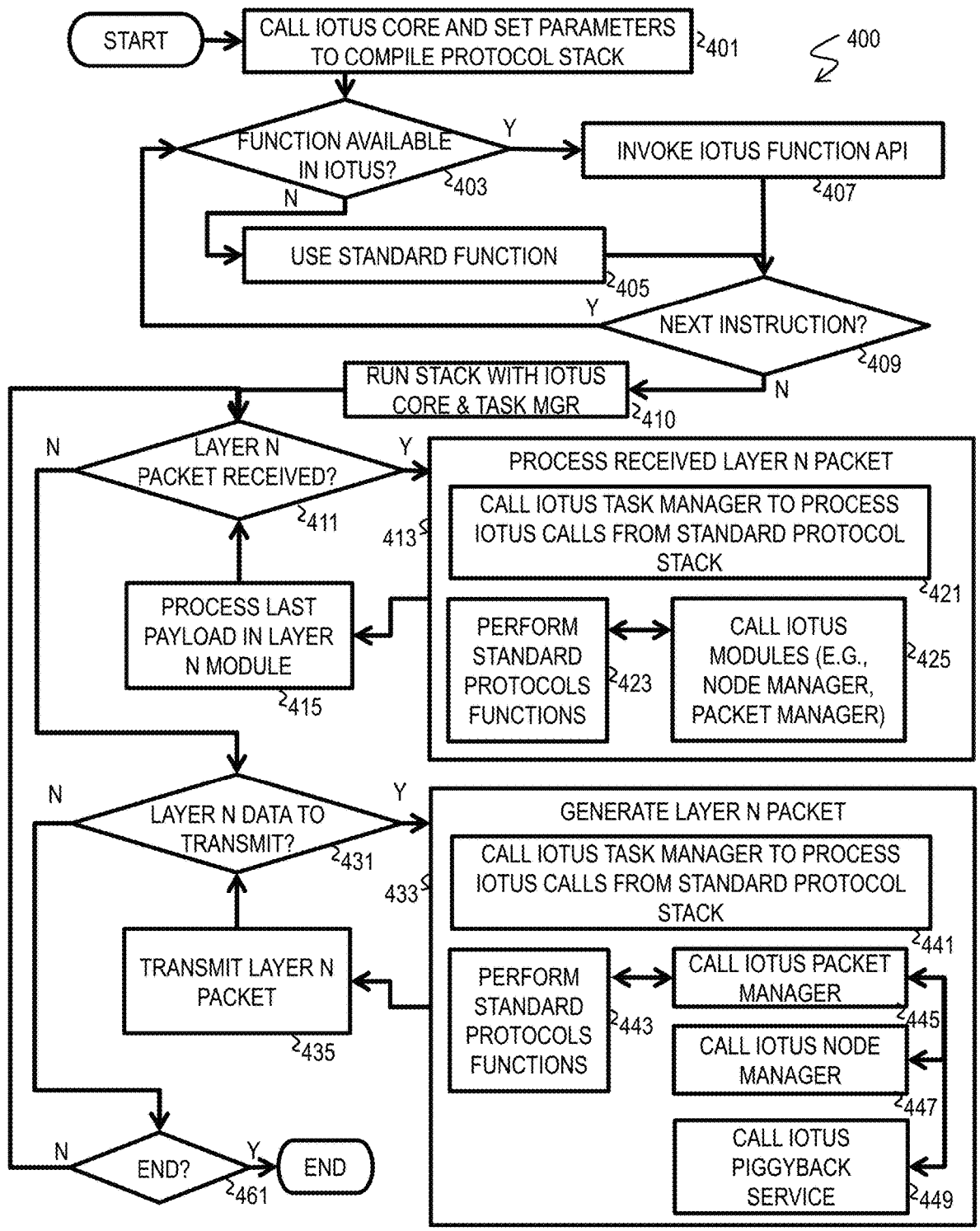
FIG. 4 is a flowchart that illustrates an example method for providing an IoTUS framework for a protocol stack, according to an embodiment.

FIG. 4 is a flowchart that illustrates an example method 400 for providing and using an IoTUS framework 310 for a protocol stack, according to an embodiment. Although steps are depicted as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401, IoTUS Core 311 is executed to compile software instructions for the traditional stack 250. During compilation, calls to an IoTUS application programming interface (API) are inserted as appropriate for various functions in the traditional stack. Thus, the application programming interface is inserted into code for each protocol of the plurality of protocols during compilation of instructions for the protocol stack, whereby original instructions for the protocol stack may be compiled with instructions for the method In some embodiments, values for compilation parameters are set during step 401 that control the compilations, such as parameters for which values indicate how aggressively control plane information can be inserted into headers for various layers in the protocol stack. Or network specific parameters can be set, as are or become known in the art, such as maximum wait times, maximum packet size, and back off times for retransmission, among others.

In step 403, it is determined whether the next instruction in the instructions for the traditional stack reference a function that is available in IoTUS framework 310. If not, control passes to step 405 to use a standard function for that instruction and control passes to step 409.

In step 409, it is determined whether there is another (next) instruction to compile. If so, control passes back to step 403, described above. If, not control passes to step 410 described below.

If it is determined in step 403 that the next instruction references a function available in IoTUS framework 310, then control passes to step 407. In step 407, an appropriate call to the IoTUS API is inserted into the compiled instructions for the traditional stack. There is at least one call to IoTUS Core 311 and to IoTUS Task Manager 312 inserted into the compiled code. Control then passes to step 409 to determine if there is another instruction to compile or not, as described above.

When it is determined in step 409 that there is no further instruction in the protocol stack to compile, control passes to step 410. In step 410, the compiled instructions for the stack are executed, including at least one call to IoTUS core 311 and at least one call to IoTUS Task Manger 312. During execution of the compiled code, steps 411 through 461 are performed.

In step 411, it is determined whether a packet for layer N is received (e.g., a layer 5, application layer, packet, or a control plane packet for one of the lower layer protocols, such as a network layer, layer 4, control plane packet). If so, control passes to step 413 to process the received packet layer by layer. In step 415, the last (highest) layer payload is processed and control passes back to step step 411.

In the illustrated embodiment, step 413 to process the received layer N packet, includes steps 421, 423 and 425, at least. In step 421, a call to the IoTUS Task Manger is made to manage multiple simultaneous calls to the IoTUS framework 310 modules from the standard protocol stack 250, e.g., using a subscription approach. In step 423 standard protocol functions are performed. In step 425, IoTUS Node Manager 314 maintains information about neighbors, e.g., by updating data in pointers data structure 370. In some embodiments, other IoTUS modules are called during step 425, such as Packet Manager 314 to let each protocol properly access the appropriate headers in the single buffer 381 for the received packet.

If it is determined instep 411 that another Layer N packet has not yet been received, the control passes to step 431 to determine if there is a Layer N packet to transmit, e.g., a control plane KA message or a result from the application layer. If not, control passes to step 461 to determine if end conditions are satisfied, e.g., the node is being powered down, or going to sleep to save power or some duty cycle has terminated. If end conditions are satisfied, the process ends. Otherwise, control passes back to step 411 and 431 to determine whether a packet has been received or is has to be generated and transmitted, respectively.

If it is determined in step 431 that there is layer N data to transmit, control passes to step 433 to generate the packet layer by layer. In step 435, the completed packet is transmitted.

In the illustrated embodiment, step 433 to generate the Layer N packet, includes steps 441, 443, 445, 447 and 449. In step 441, a call to the IoTUS Task Manger is made to manage multiple simultaneous calls to the IoTUS framework 310 modules from the standard protocol stack 250, e.g., using a subscription approach. In step 443 standard protocol functions are performed. In step 445, IoTUS Packet Manager 314 is called to let each protocol properly access the appropriate headers in the single buffer 381 for the packet being generated. Generating a packet includes determining which neighbor to use to send the data packet and that is based on a call to the IoTUS Node manager 447. In some embodiments, Piggyback Service 316 is called in step 449 to determine whether a control plane packet, such as a Keep Alive message (KA) is directed to a node that will pass a higher layer packet already in one of the buffers in packet structure block 380. If so, the control plane fields are added (aggregated) to the appropriate header of the buffer 381 for that packet already in packet structure block 380.

Figure 5A:
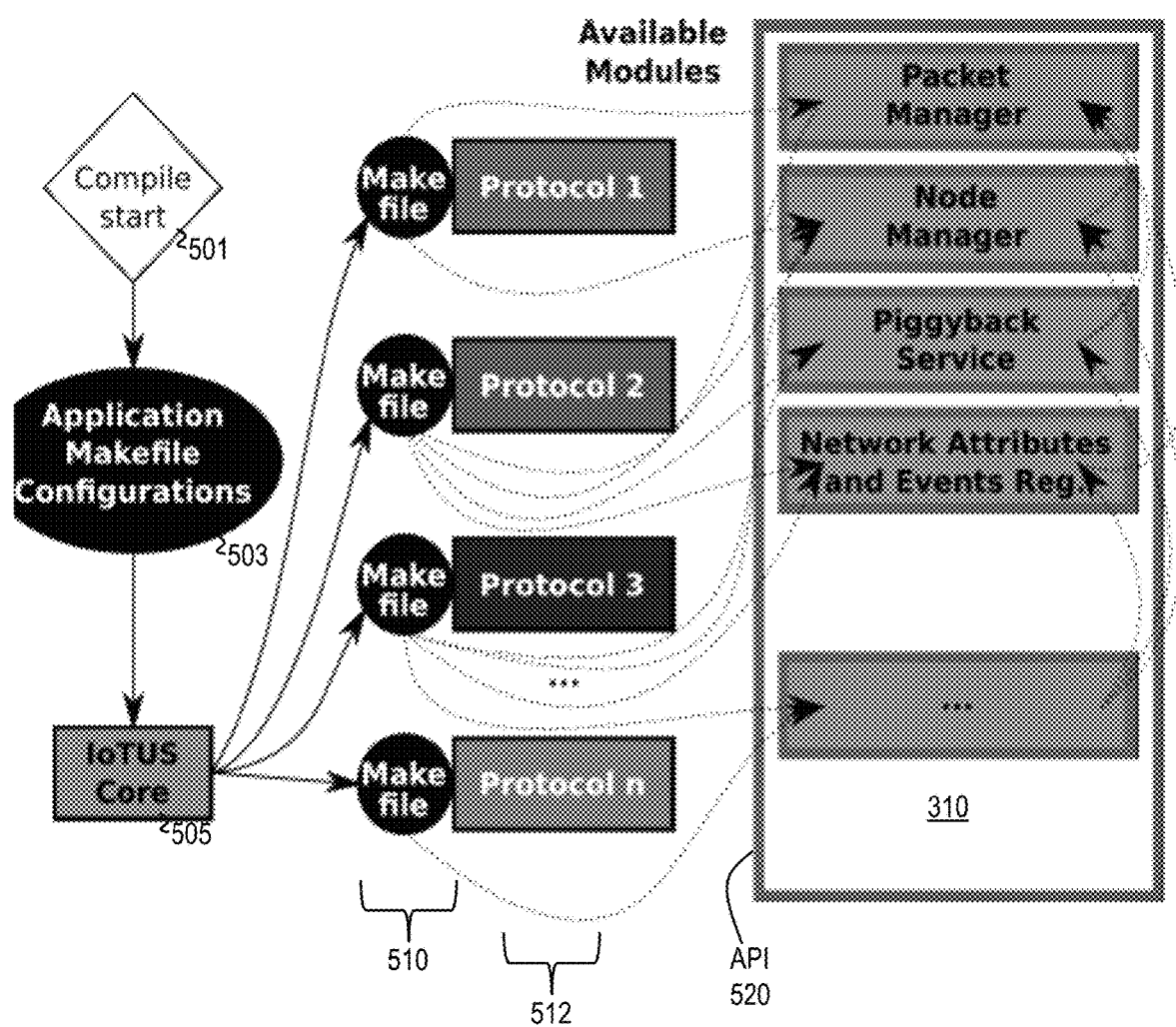
FIG. 5A is a block diagram that illustrates an example IoTUS core installing requested modules from different protocols, according to an embodiment.

FIG. 5A is a block diagram that illustrates an example IoTUS Core 311 installing requested modules from different protocols, according to an embodiment. For example, this occurs in step 410. An important function is given by the software compilation stage 501, where IoTUS Core 311 compilation directives or instructions (here referenced as makefiles) manage which modules are installed. As shown in FIG. 5A, at the beginning of a device operation, the IoTUS Core 311 interfaces different protocols 512. In some embodiments, the application makefile has some expected parameters to start and set how IoTUS Core 311 operates, e.g., in step 503. Then, IoTUS Core 311 makefile continues the compilation in step 505, reading and installing the other necessary requested modules from each protocol 512 makefile 510. This is a compilation step, which selects only the useful modules or sub-modules of IoTUS framework 310 to be installed, reducing the overall implementation size. Each module or sub-module also has its own makefile, which can request another module or sub-module to be installed, creating the dependency system. As the protocols know exactly which module functions they use, the interface functions and API (Application Programming Interface) 520 are known, making every input and output in that module understood by the operating protocol.

IoTUS Core 311 is also responsible for starting all installed modules at runtime (e.g., in step 410). IoTUS Core 311 also provides functions to simplify procedures between major modules, e.g., getting a neighbor's reference (by address) within Node Manager 314 and using it to create a packets with Packet Manager 313.

Node manager 314 handles the neighbors of the current node. Much information extracted by different layers can be attached to a given neighbor node; however, protocols usually do not share this data. This module centralizes the data gathered about neighbors. It creates a standardized way to share a determined set of information; thus, allowing shared neighbor data to be stored in structures of blocks, retrieving its block by reference pointers or search by address number, e.g., in pointers structure 370. For example, the link quality extracted by the physical layer can be attached to the node structure block, along with the address given by the second layer and the rank (how distant, in number of hops, the node is from a sink node) given by the third layer. Such approach reduces memory usage, redundancy and improves cross-layer decisions. Thus, at least the Node Manager 314, in response to receiving input at the application programming interface from a first protocol, updates at least one bit in a table maintained by a different second protocol.

Similar to the Node Manager 314, Packet Manager 313 is responsible to concentrate most of packet information into one structure (single Buffer 381), as represented by the small circles being added as headers to the big packet block in FIG. 3B. That means having shared data in one place, where every layer can understand what is being added to the header. Moreover, Packet Manager 313 works on top of the Node Manager 314 and saves memory space by pointing to its structure block instead of copying all of it. Many packet parameters like source and destination addresses are available in a standardized manner. Also, this information is available across the layers when the packet is being built. However, differently from the static way Rime/ContikiOS allocates the whole collection of possible data, IoTUS framework does it dynamically, allocating only the necessary memory for the information attached through linked lists.

Along with the Node Manager 314, the packet references their source and destination nodes using this new system; thus, creating an integration that facilitates other services to operate, like aggregation of packets. FIG. 2 and FIG. 3 shows a side-by-side comparison between a traditional layered stack and the same stack extended with the IoTUS framework 310 by showing how an application message is processed before being transmitted. In the traditional way depicted in FIG. 2D, messages are sent down the stack using abstract functions and encapsulating headers in the buffer. As shown in FIG. 3B, the same stack with IoTUS framework builds the message using dynamic packet structure blocks. The Packet Manager 313 creates a buffer that can hold headers and small information block attached to it. Each small block contains well defined and known information, the packet fields. Hence, after the application layer signals the messaging procedure in the shared layer, the packet structure block (buffered) is reserved and a signal is sent to the lower layer. Layers below set small structure blocks that are attached to the packet structure block along with their headers. This process is represented by the small circles numbered with the layer rank (4 to 1). At the physical layer, all information attached is readable and the packet is ready to be transmitted.

Figure 5B:
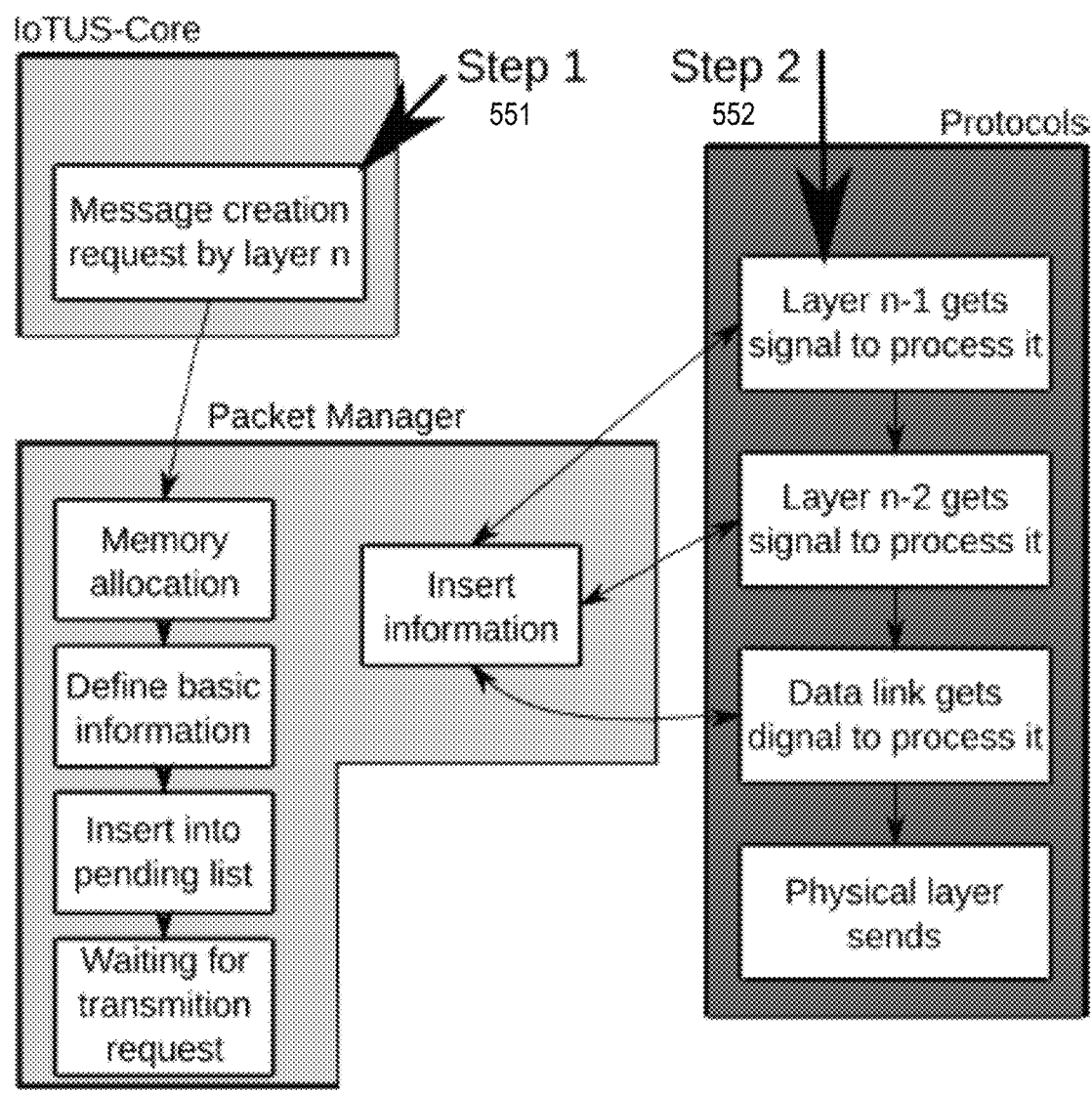
FIG. 5B is a block diagram that illustrates an example message construction using IoTUS, according to an embodiment.

FIG. 5B is a block diagram that illustrates an example message construction using IoTUS, according to an embodiment The creation of a packet container in the IoTUS system can be seen here, where step 1 (551) represents a calling from a protocol to the message creating function, defining some basic information (payload, destination node, parameters, timeout and others). Continuing, lower layers will get information (step 2, 552) to process this packet. In this way, packets are always stored in a list of dynamic containers to which all layers have access. IoTUS' services generally use pointer references (e.g., in pointers structure 370) to other services block structures, which allows the framework 310 to keep information up to date. Thus, in response to receiving input at the application programming interface from a first protocol, updating at least one bit in the single packet buffer based on the input and on data in a table maintained by a different second protocol.

The Task Manager 312 assigns tasks to each running protocol. Since IoTUS framework 310 proposes shared services and functionality, it would be possible that two or more protocols using the same service would then request it to start a procedure more than once. Hence, synchronization is advantageous. However, it does not block any protocol from performing a redundant operation by itself; instead, it just informs all layers which service is done by each protocol, keeping the redundancy, if requested.

The process of assigning sequence for a task is done at the startup of the device by each protocol using this framework. Task Manager 312 has a subscription system that allows each protocol to check which one is finally responsible for each task. Inside this module, priorities are usually given to the protocols located in lower layers, e.g., protocols in physical and data link layers have higher priority than network and application layers. This also solves some issues with addressing, packet aggregation, and other tasks.

In the case of addressing, most of the data link protocols have their own methods to look for a neighbor's address. Thus, the traditional protocols already have to use the header to insert these addresses. A network layer that checks which node the data link layer is already addressing can use this feature to synthesize their addressing system accordingly, which is done in a similar way by the 6LoWPan protocol [4].

Another case is given by the aggregation service. In many cases it is done by the network layer, but if the data link layer has some procedures that would benefit from aggregating their control packets, then it could request to operate the shared service called aggregation.

IoTUS framework 310 provides data aggregation, in some embodiments, through a Piggyback Service 316, which is advantageous for optimizing energy consumption by reducing network overhead and radio transmissions. Protocols can create piggyback blocks (pieces), such as values for one or more fields for their respective headers or control plane payloads; and, set defined parameters like timeout, destination address and others. Furthermore, if timeout expires, Piggyback Service 316 signals the callback function of the block owner, so that the protocol sends that data as soon as possible. However, if conditions are matched, the piggyback pieces are aggregated (with small compact headers) into the outgoing packet.

Therefore, Piggyback Service 316 uses Node Manager 314 and Packet Manager 313. According to some embodiments, conditions to insert a piggyback block into a packet are:

There is an outgoing packet;
The packet has to be flagged as allowing aggregation by its creator protocol; and,
The packet is addressed to the same next router(s). (Eventually, to the same final destination node).

This service creates control frames overhead that avoid separate transmissions to shared destinations in the network. Thus, many layers can rely on it to have their control packet optimized. For example, an IPv6 Routing Protocol for Low-Power and Lossy Networks (RPL) creates a topology similar to a tree (directed acyclic graph, DAG). A DAO packet is a message sent by the teams to update the information of their "parent" nodes throughout the DAG. Such a packet can easily be aggregated with a packet sent for a different layer (higher or lower) protocol using the Piffyback Service 316.

Figure 6A:
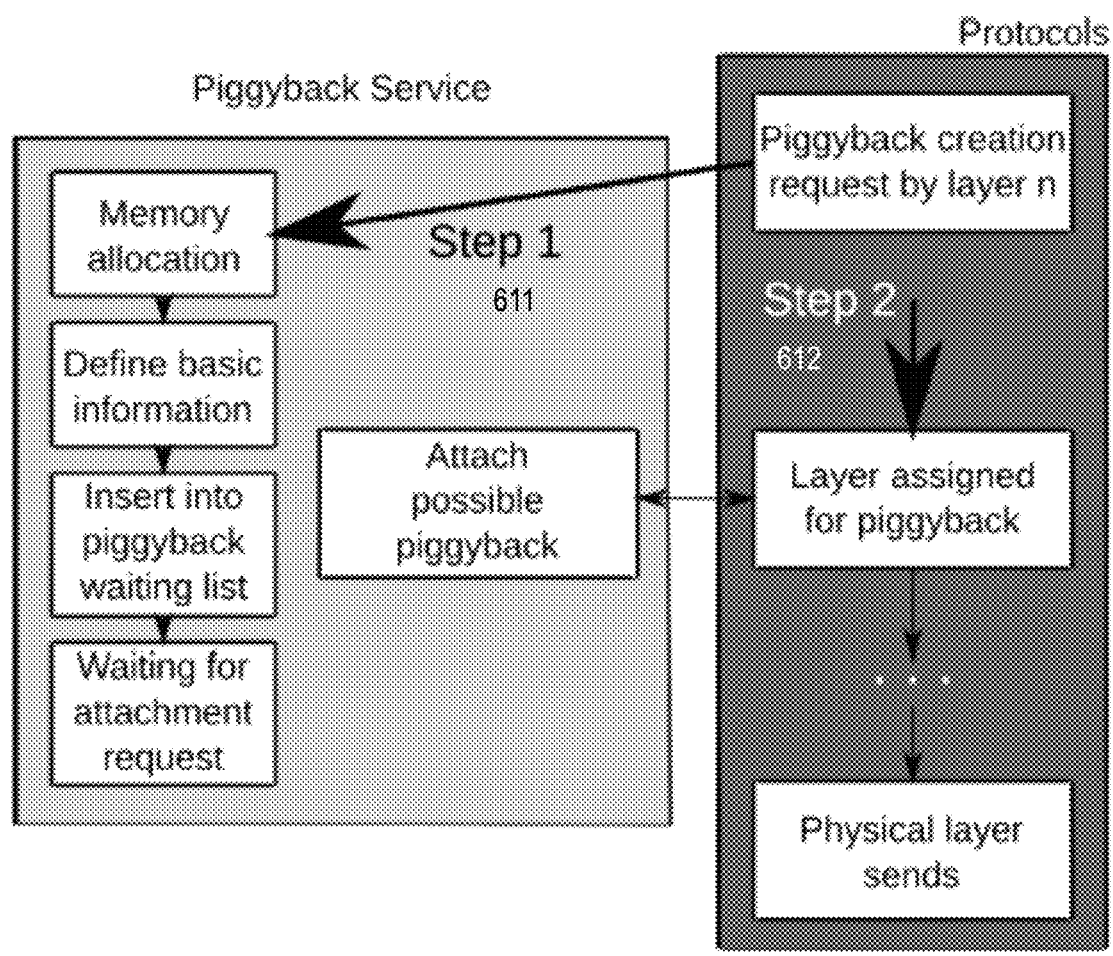
FIG. 6A is a block diagram that illustrates an example piggyback services using IoTUS, according to an embodiment.

FIG. 6A is a block diagram that illustrates an example piggyback services using IoTUS, according to an embodiment. Protocols start by a similar process as the packet Manager 313, allocating resources with specific functions of the module (Step 1, 611 of FIG. 6A). Later, if any protocol was previously assigned by the Task Manager 312, the Piggyback Service 316 will try to attach possible piggyback blocks into a packet being built, aggregating its information (Step 2, 612 of FIG. 6A).

Figure 6B:
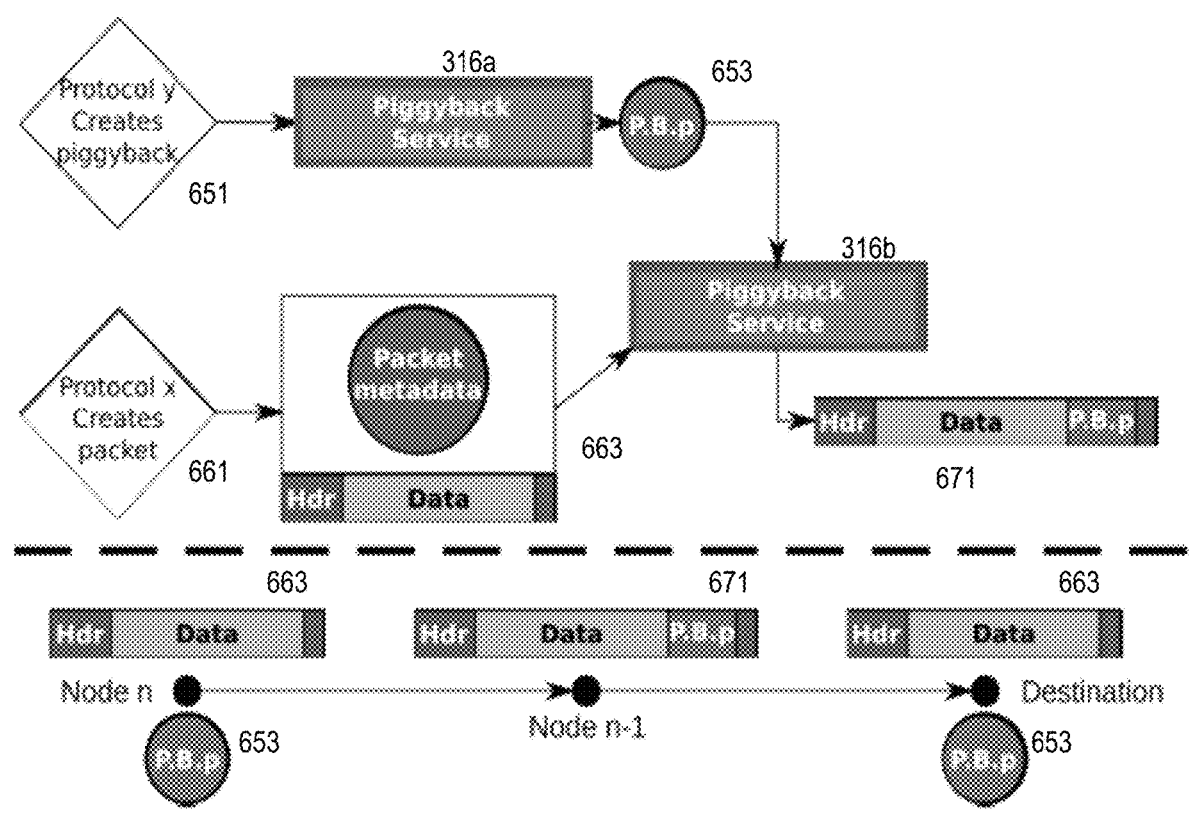
FIG. 6B is a block diagram that illustrates an example piggyback aggregation and transmission using IoTUS, according to an embodiment.

From another point of view, FIG. 6B is a block diagram that illustrates an example piggyback aggregation and transmission using IoTUS, according to an embodiment. FIG. 6B shows the piggyback piece (P.B.p. 653) being created by "Protocol y" 651, which represents the Step 1 in FIG. 6A call to Piggyback Service 316a. When "Protocol x" 661 creates a packet 663, headers (Hdr) are attached. At some assigned layer, Piggyback Service 316b is called again and it attaches the pieces that matches this condition, representing the Step 2 in FIG. 6A generating an aggregated packet 671. Bellow the dashed line, this process is represented by a node n using this procedure to piggyback piece 653 with packet 663 and delivering the aggregated packet 671 packet through intermediate node n1 to its destination node destination, in which the piggyback piece 653 is detached again and delivered to the target node's protocol.

3. EXAMPLE EMBODIMENTS

Figure 7:
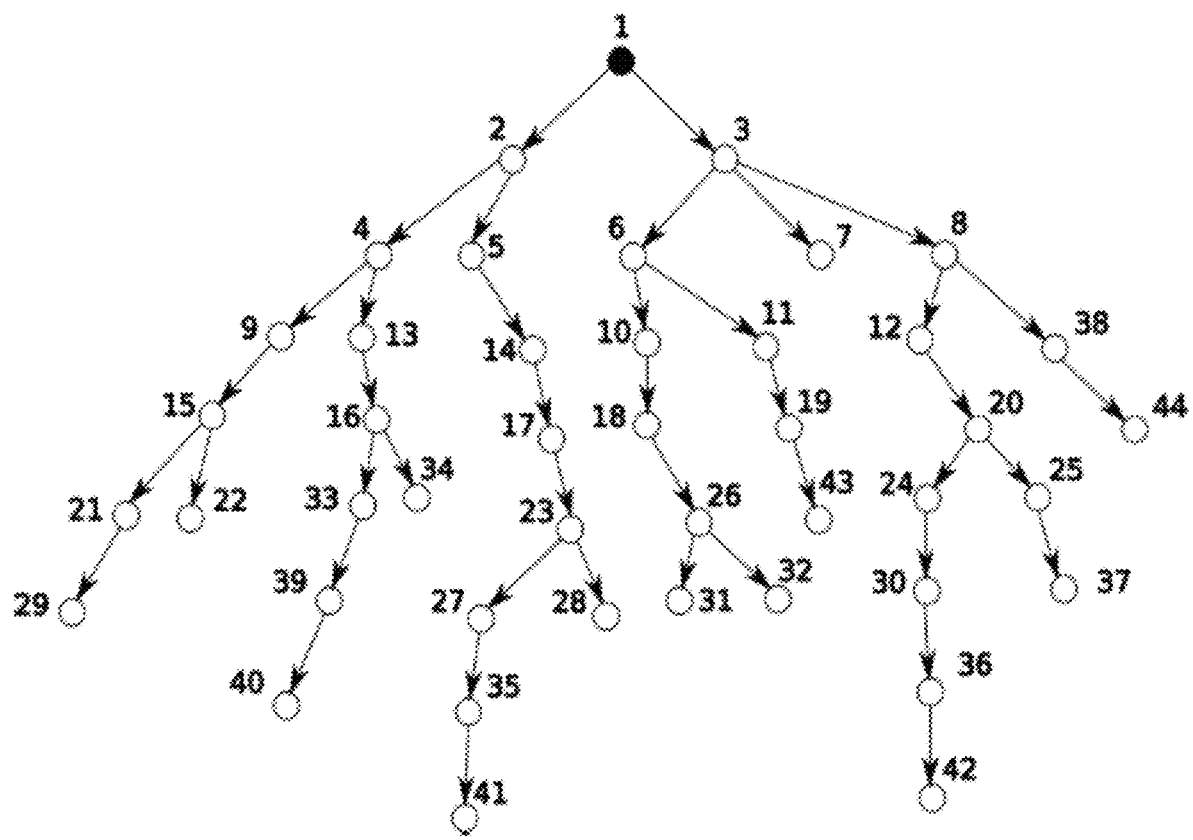
FIG. 7 is a block diagram that illustrates an example tree topology for environmental monitoring using smart sensors in an IoT, according to an experimental embodiment.

To illustrate IoTUS' operation, an environmental monitoring application is considered as an experimental embodiment, in which nodes use a basic network protocol stack composed of a data link protocol, e.g., ContikiMAC [23], a static routing protocol, and an application that sends periodic data from sensing nodes forming a tree rooted at the data sink (the destination for the sensor data). Statements made in this section apply only to the example embodiments described here. FIG. 7 is a block diagram that illustrates an example tree topology for environmental monitoring using smart sensors 2 through 44 in an IoT, according to an experimental embodiment. Node 1 is the root of the tree (the data sink).

IoTUS operation was evaluated using the Cooja-ContikiOS [8], [19] simulation/emulation platform. Cooja was used for the following reasons: first, it provides an experimental platform specifically designed for networks of capability-constrained wireless devices (e.g., wireless sensor networks, IoT) where one can run controlled and reproducible experiments; as such, it includes an implementation of the ContikiOS protocol stack [7], which is used as basis of comparison against IoTUS; additionally, the same code developed to run on Cooja-ContikiOS can be directly ported to real devices running ContikiOS, as well as testbeds which are accessible to the research community. In particular, an experimental embodiment of IoTUS was implemented under ContikiOS [19] for the TMote Sky [24] device emulated within Cooja.

The experimental embodiment is a general environmental monitoring application in which sensing nodes are deployed to periodically sense the environment (e.g., temperature, humidity, etc.) and transmit their readings through the network to a data sink (node 1). FIG. 7 shows the 44-node tree topology that was used in experiments. The tree is rooted at the data sink (node 1) and intermediate and leaf nodes are sensing nodes. Note that intermediate tree nodes act both as traffic generators as well as forwarders.

Table 1 shows the simulation parameters and their corresponding values used in these experiments. The values used for sensing rate and application payload size have been previously used in the literature (e.g., [25]). For the keep alive messages, which, as described above, are control messages periodically generated by the network layer that are transmitted through the tree towards the root, their size and frequency are set based on ContikiOS' implementation of RPL.

TABLE 1

Simulation parameter values

| Parameter | Value |
|---|---|
| Sensing rate (application layer packets) | 30 seconds |
| Application layer payload size | 20 bytes |
| Keep Alive (KA) control data size | 12 bytes |
| KA transmission rate | 30 seconds |
| Random delays for application packets | 15 seconds |
| Application piggyback timeout | 29 seconds |
| ContikiMACs RDC wake-up period | 0.125 seconds |
| Data Link Beacon period | 4 seconds |
| Network's DIO rate (broadcast packet) | 4 seconds |
| Neighbor discovery scanning duration | 5 seconds |
| Data Link backoff | 2 seconds |
| Cooja's radio medium | UDGM: Distance Loss |
| Cooja's mote startup delay | 1 second |
| Cooja's mote transmission range | 50 meters |

TMote Sky's power consumption specification is summarized in Table 2. Note that Cooja's emulation of Tmote Sky provides four different power modes for the radio, namely Reception, Transmission, Idle, and Sleep, and two for the micro-controller, Active, and Sleep. Energy consumption measurements were provided by two different Cooja-ContikiOS tools, namely: PowerTrace and PowerTracker. PowerTrace is a tool available inside the ContikiOS implementation, which periodically reports energy consumption information through its serial port. PowerTrace reports time spent in each state (transmitting, receiving, idle, or sleep for the radio, and active or idle for CPU). PowerTracker is available in the Cooja simulator and also provides power consumption measurements for the radio. However, due to its microsecond simulation granularity, it provides more accurate power consumption measurements than PowerTrace. As such, PowerTracker was used to measure energy consumed by the radio; while, CPU consumption is still extracted from the PowerTrace tool.

TABLE 2

Energy consumption by state

| State | Current (microAmperes) |
| --- | --- |
| Microcontroller Active (no radio) @ 1 MegaHertz and 3 volts | 1,800 |
| Microcontroller Sleep (no radio) | 5.4 |
| Reception | 18,800 |
| Transmission (0 deciBel-milliwatts) | 17,400 |
| Idle | 18,800 |
| Sleep | 426 |

IoTUS was evaluated in terms of its energy efficiency and memory footprint. ContikiOS' stack [7] implementation was used as a baseline. Results reported here were obtained by averaging over 10 runs using random seeds with a 95% confidence interval. While latency is an important performance metric for delay-sensitive applications, it is not considered to be critical for environmental monitoring. Though latency results are not reported here, it is noted that additional processing incurred by IoTUS (e.g., packet construction, data aggregation) may increase latency. For example, the duration between building a message at application layer and finally transmitting it was on average 4.1 milliseconds (ms) with IoTUS, while the standard ContikiOS' stack processed the same request in 1.3 ms. Depending on the end-to-end propagation delay, this difference may be negligible.

Figure 8:
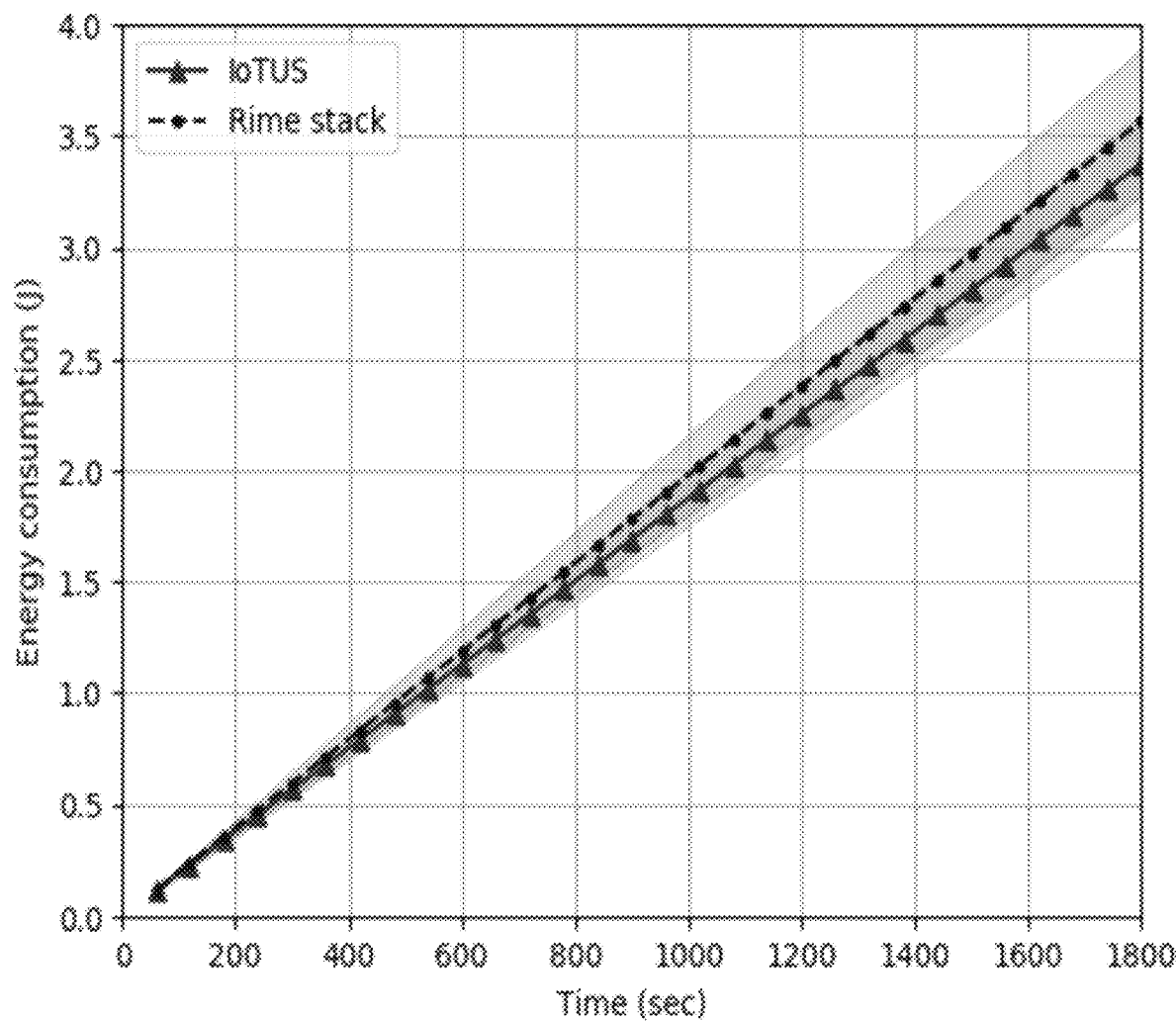
FIG. 8 is a plot that illustrates example average energy consumption per node in a 44-node tree network compared to conventional protocol stacks, according to an experimental embodiment.

FIG. 8 is a plot that illustrates example average energy consumption per node in a 44-node tree network compared to conventional protocol stacks, according to an experimental embodiment. The vertical axis indicates energy consumption in Joules (J); and, the horizontal axis indicates time in seconds. FIG. 8 plots energy consumption averaged over all 44 network nodes using the topology illustrated in FIG. 7 for both IoTUS and Rime over time. The shaded areas represent the confidence interval of each line. The experiments were run for 30 minutes to allow enough time for the system to reach steady state. IoTUS' average energy consumption gain is about 5.33%, i.e., IoTUS energy consumption in Joules is 5.33% less than the energy consumption in Joules of Rime for the same network and traffic.

Figure 9:
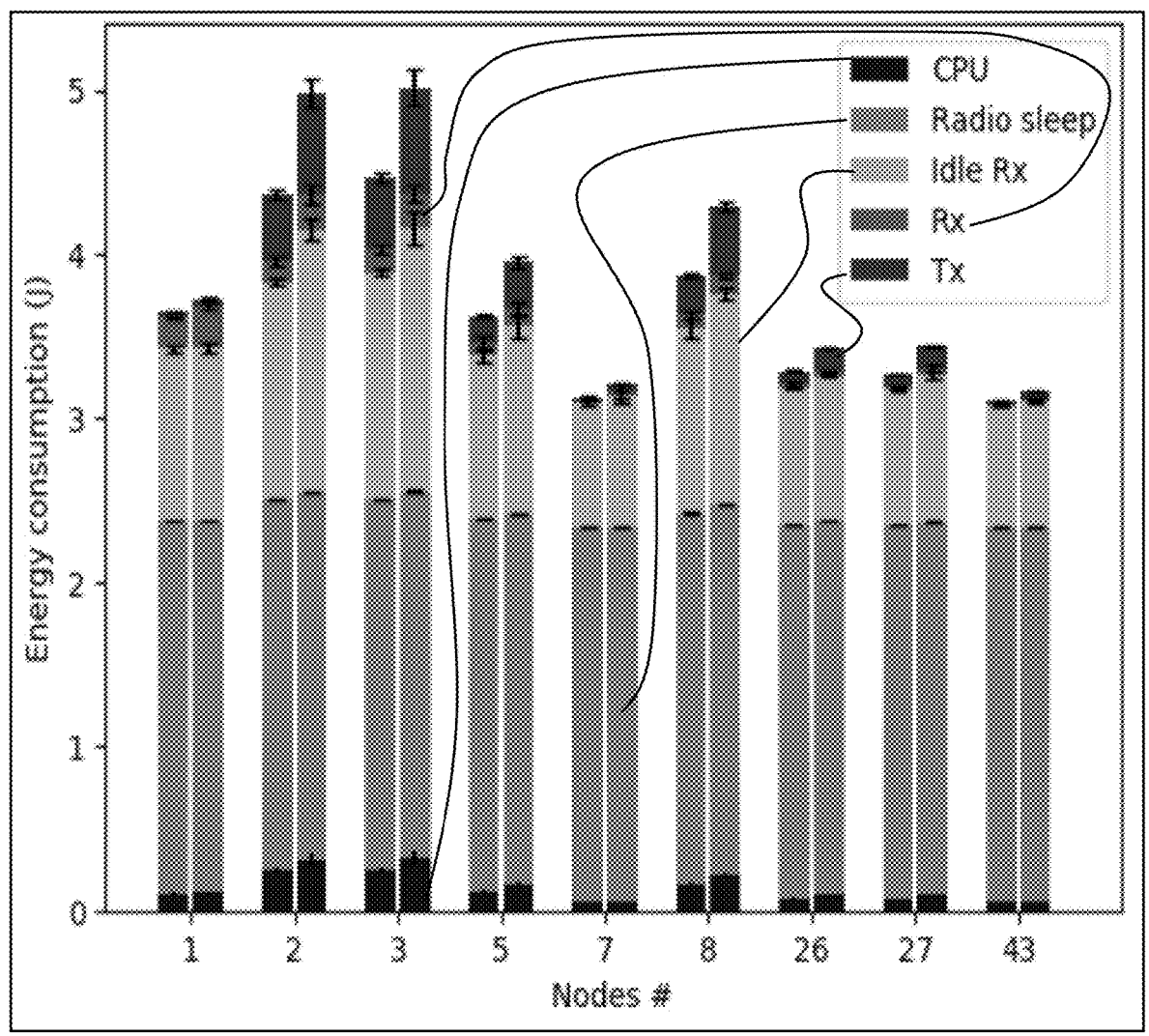
FIG. 9 is a plot that illustrates example total consumption by states of selected nodes in the 44 nodes network, according to an experimental embodiment.

FIG. 9 is a plot that illustrates an example of the total energy consumption by states of selected nodes in the 44 nodes network, according to an experimental embodiment. The horizontal axis indicates each of several nodes (1, 2, 3, 5, 7, 8, 26, 27 and 43) of the topology depicted in FIG. 7. In FIG. 9, for each node, the left bar and the right bar show the energy consumed by the node when using the IoTUS framework and the modified ContikiOS stack, respectively. The vertical axis indicates energy consumption in Joules. As shown in FIG. 9, nodes 2 and 3 experience energy savings of about 13% each. Note that these are the closest nodes to the root of the tree and, thus, are the ones that need to forward the highest number of packets on their way to the sink. Indeed, FIG. 9, shows that most of IoTUS' energy savings in the case of nodes 2 and 3 come from the radio, more specifically by spending less time in transmission mode when compared to the modified ContikiOS stack. This is mainly due to IoTUS' aggregation feature provided by the Packet Manager 313 and Piggyback Service 316. For comparison purposes, node 43, which is a leaf node, had the lowest energy savings of about 1.64%. FIG. 9 also shows energy consumed by other nodes (5, 7, 8, 26, 27) which represent a mix of intermediate and leaf nodes.

As expected, for this experiment, radio functions are by far the most energy consuming. Even though active states can consume thousands more than sleep state and up to 10 times more than CPU, FIG. 9 reveals that nodes' radios spent most of the time in either idle or sleep, and these two states contributed the most to the overall energy consumed by nodes.

Figure 10:
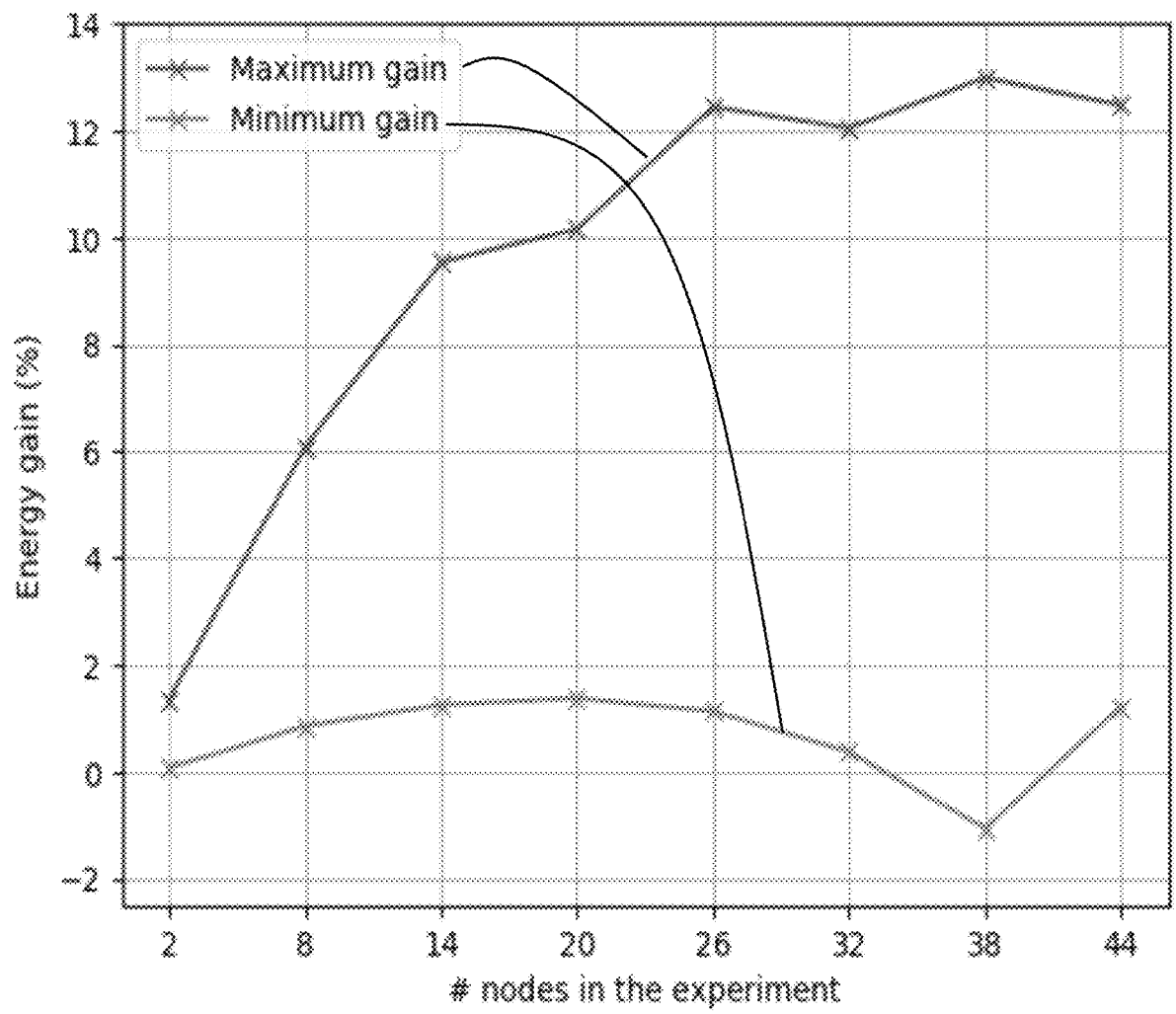
FIG. 10 is a plot that illustrates example maximum and minimum radio energy gain per nodes in the network, according to an experimental embodiment.

FIG. 10 is a plot that illustrates example maximum and minimum radio energy gain per nodes in the network, according to an experimental embodiment. The vertical axis indicates energy gain in percent; and the horizontal axis indicates number of nodes in the experiment. FIG. 10 shows the maximum and minimum energy consumption gains attained for networks of varying size. These results were obtained by using trees of sizes 2, 8, 14, 20 nodes, etc., where each tree corresponds to the tree shown in FIG. 7 but only including nodes up to node 2, 8, 14, 20, etc., respectively. It is observed that, as the network increases in size, so does the energy consumption gains obtained using IoTUS. As previously discussed, the highest gains were observed by nodes 2 and 3, which also had the highest energy consumption according to FIG. 9. Because these nodes are the most likely to be the first to have their battery depleted, guaranteeing them the highest energy savings results in extending the network's overall lifetime.

Figure 11:
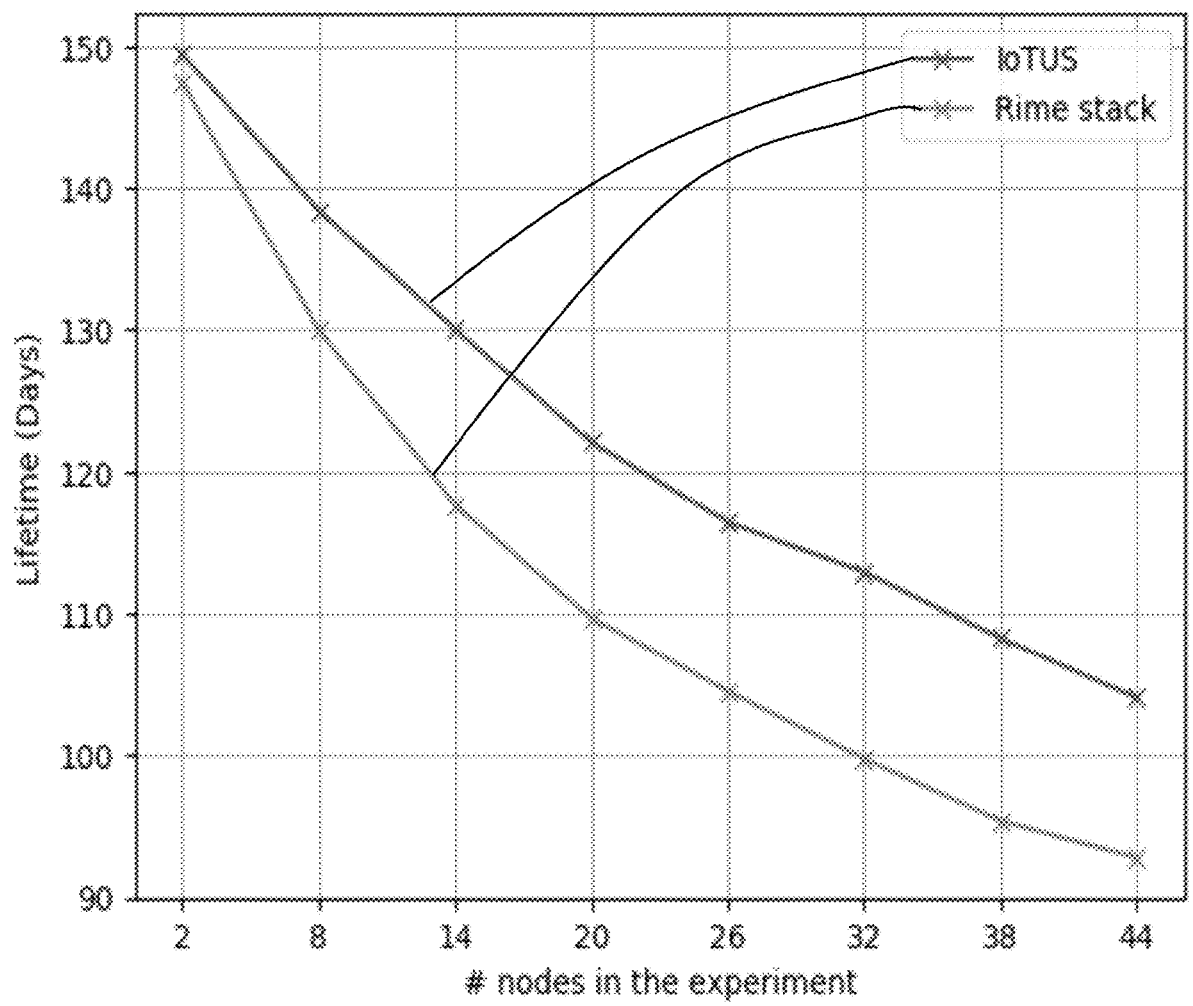
FIG. 11 is a plot that illustrates example maximum lifetime per number of nodes in the network, according to an experimental embodiment.

FIG. 11 is a plot that illustrates example maximum lifetime per number of nodes in the network, according to an experimental embodiment. The vertical axis indicates network lifetime in days; and the horizontal axis indicates number of nodes in the experiment. FIG. 11 presents results for expected node lifetime for tree topologies of varying sizes. Node lifetime is defined as the time between the start of the experiment until the node's battery is depleted. To calculate lifetime, each device is considered to be supplied with two AA cells of NiMH type (2000 milliAmpere hours, mAh), which would provide up to 22.32 kiloJoules (kJ) at 3.1 Volts according to [26]. A node's lifetime is then obtained by dividing the node's battery capacity by the node's average power consumption. Considering nodes 2 and 3 which exhibit the highest energy consumption, IoTUS achieves a lifetime gain of up to 11 days—representing an improvement to 12.11% over Rime. Furthermore, for this particular topology, once nodes 2 and 3 deplete their batteries, the rest of the network gets disconnected from the sink and therefore is no longer able to perform its monitoring task.

It is noted that, with the current setup, comparisons were not run using trees with more than 44 nodes. The problem is due to the Rime stack, and the RAM size needed by the Rime stack which exceeded the 10 KByte TMote Sky RAM capacity. However, using IoTUS, larger tree topologies could still be emulated, which attests to IoTUS' efficient memory footprint.

Figure 12:
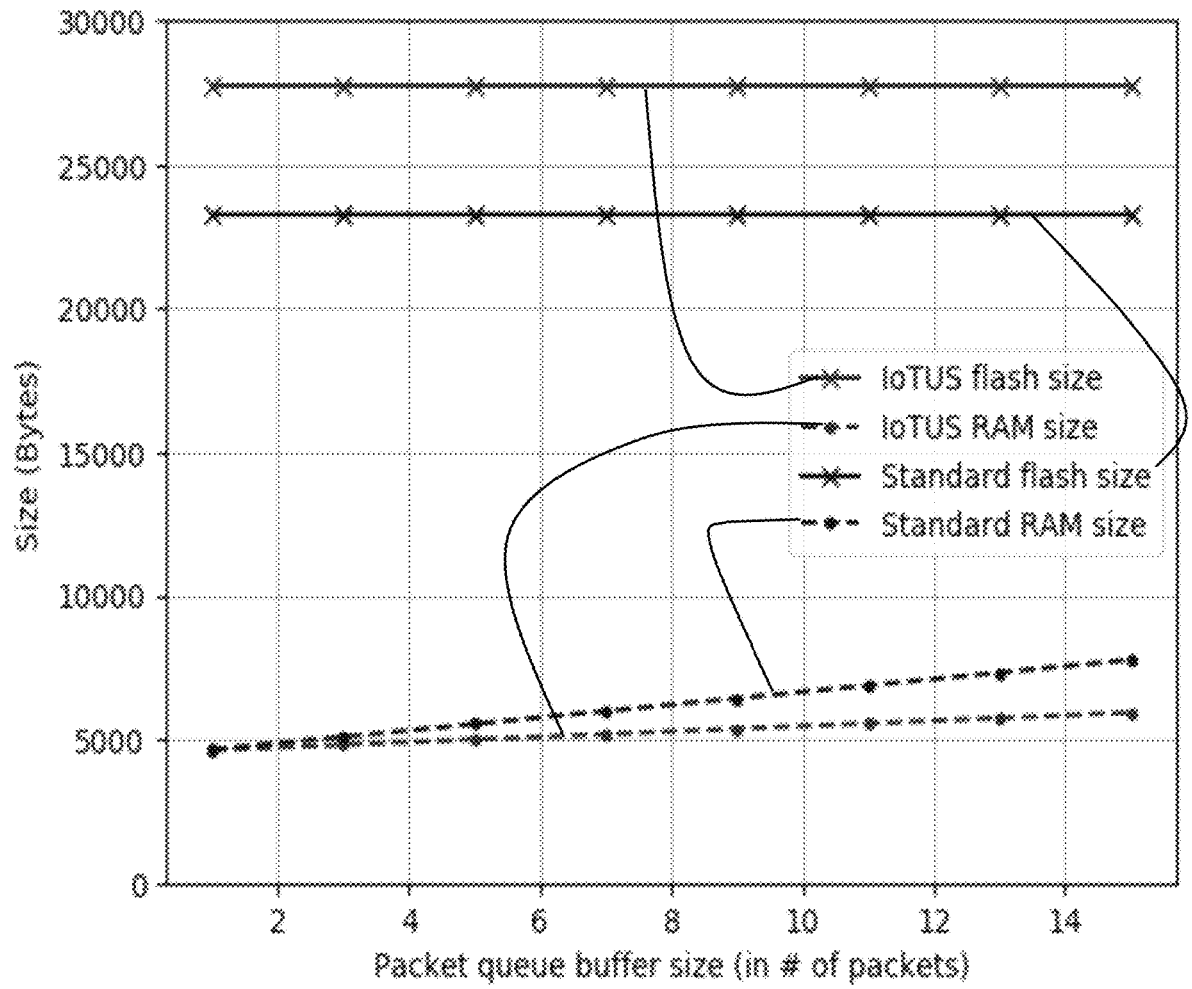
FIG. 12 is a plot that illustrates example memory usage when increasing packet buffer capacity, according to an experimental embodiment.

FIG. 12 is a plot that illustrates example memory usage when increasing packet buffer capacity, according to an experimental embodiment. The vertical axis indicates total memory footprint size in bytes; and, the horizontal axis indicates the number of packets simultaneously being processed, so called in the buffer queue, e.g., packet structure block 280 for IoTUS. FIG. 12 shows comparative memory footprint characterization between IoTUS and Rime as packet buffer size increases. While IoTUS requires additional flash space (less than 5 kiloBytes, or 18% more than Rime), it saves RAM storage through its ability to share information across layers, e.g., in single buffer 281 and pointers to protocol tables in block 270, and thus avoid information duplication. As shown in FIG. 12, IoTUS' memory footprint savings increases with the size of the packet buffer. In this experiment, memory saving reaches 23.63% for a packet structure block 380 size of 15 packets.

4. COMPUTATIONAL HARDWARE VARIATIONS

Figure 13:
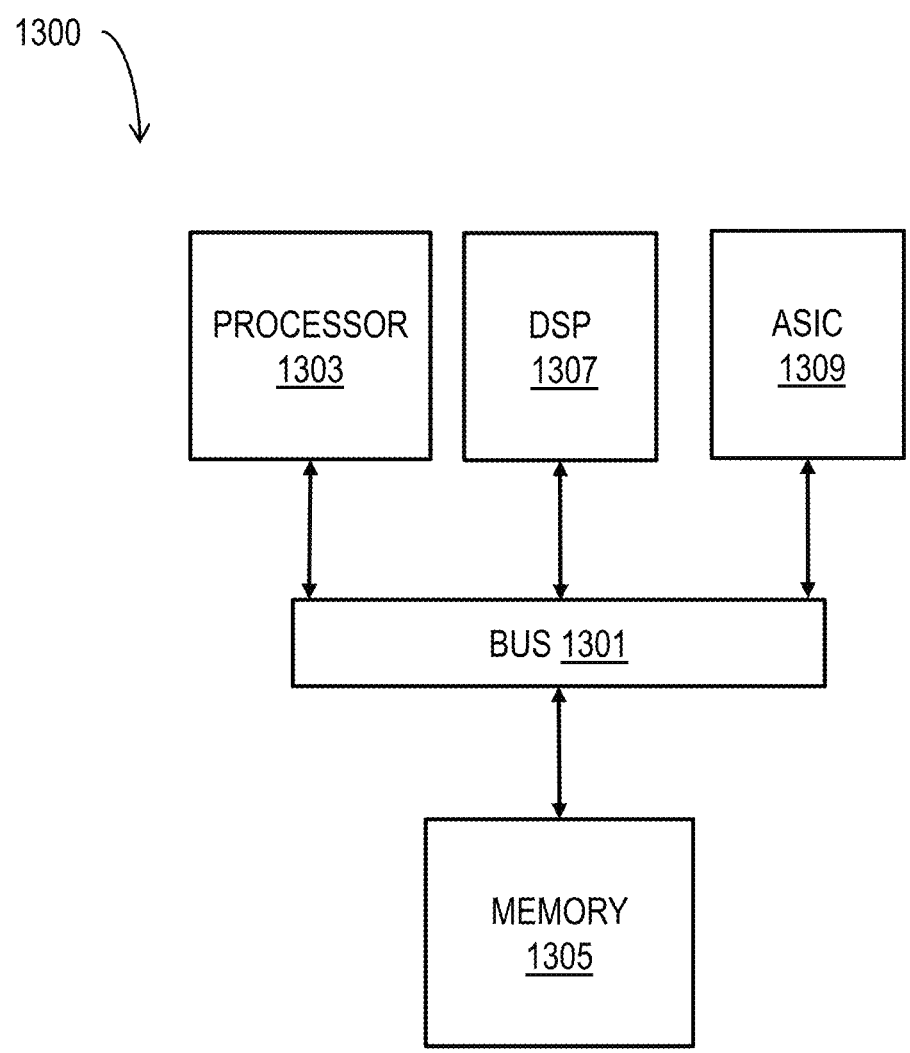
FIG. 13 illustrates a chip set upon which an embodiment of the invention may be implemented.

FIG. 13 illustrates a chip set 1300 upon which an embodiment of the invention may be implemented. Chip set 1300 is programmed to perform one or more steps of a method described herein and includes, for instance, the processor and memory components described with respect to FIG. 1 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of a method described herein.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1305 also stores the data associated with or generated by the execution of one or more steps of the methods described herein.

Figure 14:
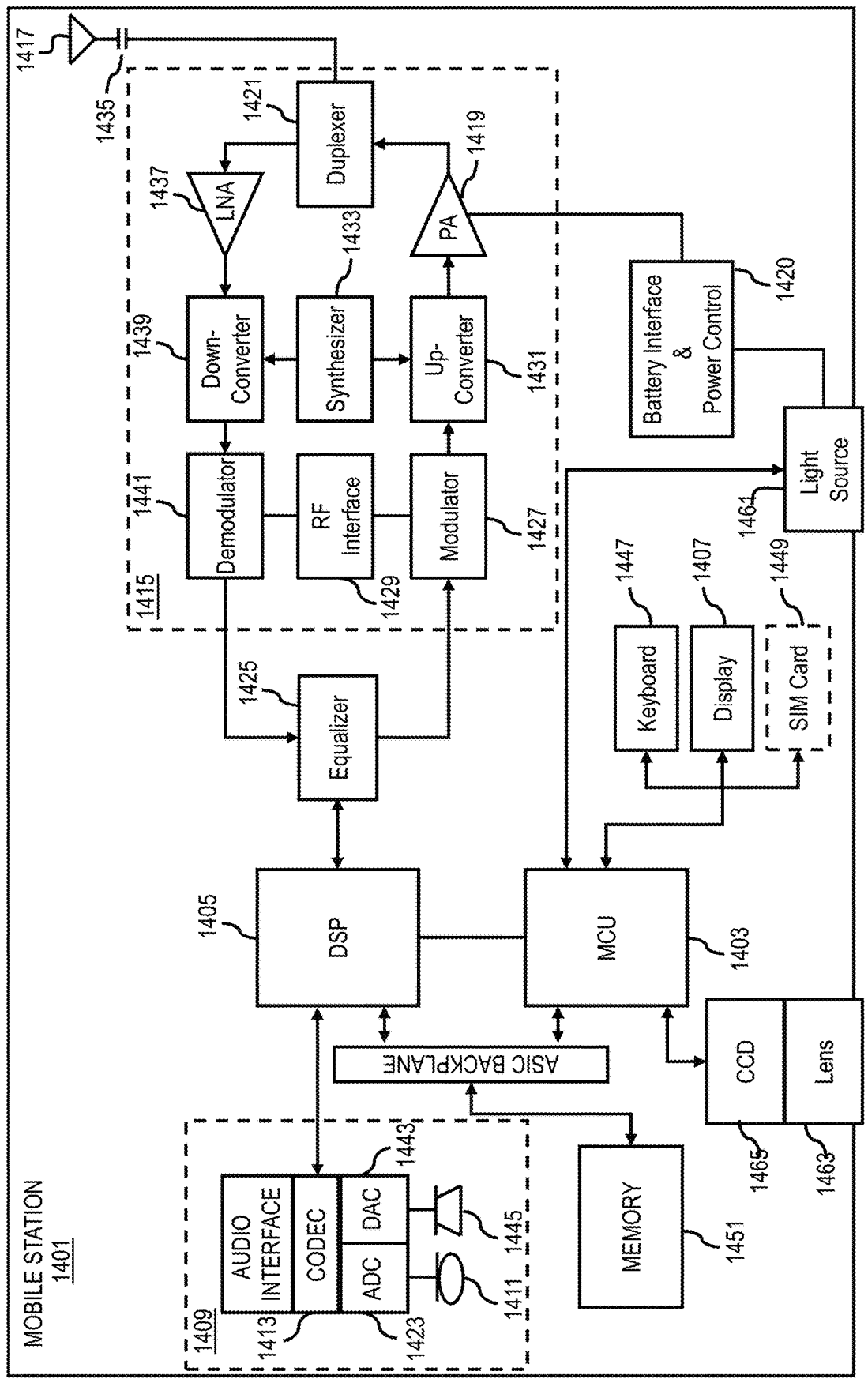
FIG. 14 is a diagram of example components of a mobile terminal (e.g., cell phone handset) for communications, which is capable of operating in the system, according to one embodiment.

FIG. 14 is a diagram of example components of a mobile terminal 1400 (e.g., cell phone handset) for communications, which is capable of operating in the system, according to one embodiment. In some embodiments, mobile terminal 1401, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps as described herein. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 as described herein. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

In some embodiments, the mobile terminal 1401 includes a digital camera comprising an array of optical detectors, such as charge coupled device (CCD) array 1465. The output of the array is image data that is transferred to the MCU for further processing or storage in the memory 1451 or both. In the illustrated embodiment, the light impinges on the optical array through a lens 1463, such as a pin-hole lens or a material lens made of an optical grade glass or plastic material. In the illustrated embodiment, the mobile terminal 1401 includes a light source 1461, such as a LED to illuminate a subject for capture by the optical array, e.g., CCD 1465. The light source is powered by the battery interface and power control module 1420 and controlled by the MCU 1403 based on instructions stored or loaded into the MCU 1403.

5. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

6. REFERENCES

Each of the following references is hereby incorporated by reference, as if fully set forth herein, except for terminology inconsistent with that used herein.
[1] Webopedia, "The 7 layers of the OSI Model." [Online]. Available on World Wide Web domain webopedia.com at page quick ref/OSI Layers.asp.
[2] B. Fu, Y. Xiao, H. J. Deng, and H. Zeng, "A survey of cross-layer designs in wireless networks," IEEE Communications Surveys and Tutorials, vol. 16, no. 1, pp. 110-126, 2014.
[3] L. D. Mendes and J. J. Rodrigues, "A survey on cross-layer solutions for wireless sensor networks," Journal of Network and Computer Applications, vol. 34, no. 2, pp. 523-534, 2011.
[4] S. Chakrabarti, G. Montenegro, R. Droms, and J. Woodyatt, "Ipv6 over low-power wireless personal area network (6lowpan) esc dispatch code points and guidelines," February 2017. [Online]. Available on World Wide Web domain rfc-editor.org at page info/rfc8066

[5] I. Akyildiz, M. Vuran, and O. Akan, "A Cross-Layer Protocol for Wireless Sensor Networks," in Proceedings of the 2006 40th Annual Conference on Information Sciences and Systems. Princeton, N.J., USA: IEEE, mar 2006, pp. 1102-1107.

[6] S. A. Madani, S. Mahlknecht, and J. Glaser, "A Step towards Standardization of Wireless Sensor Networks: A Layered Protocol Architecture Perspective," in Proceedings of the 2007 International Conference on Sensor Technologies and Applications (SENSORCOMM 2007). Valencia, Spain: IEEE, oct 2007, pp. 82-87.

[7] A. Dunkels, F. O" sterlind, and Z. He, "An adaptive communication architecture for wireless sensor networks," in Proceedings of the 5th international conference on Embedded networked sensor systems-SenSys '07. Sydney, Australia: ACM Press, 2007, pp. 335-349.

[8] F. O" sterlind, A. Dunkels, J. Eriksson, N. Finne, and T. Voigt, "Crosslevel sensor network simulation with COOJA," in Proceedings of the Conference on Local Computer Networks, LCN. IEEE, 2006, pp. 641-648.

[9] T. Winter, Ed., P. Thubert, Ed., A. Brandt, J. Hui, R. Kelsey, P. Levis, K. Pister, R. Struik, J. Vasseur, and R. Alexander, "Rpl: Ipv6 routing protocol for low-power and lossy networks," March 2012. [Online]. Available on World Wide Web domain rfc-editor.org at page/info/rfc6550

[10] A. Parasuram, D. Culler, and R. Katz, "An Analysis of the RPL Routing Standard for Low Power and Lossy Networks," Technical Report No. UCB/EECS-2016-106, p. 98, 2016.

[11] I. Solis and K. Obraczka, "FLIP: A Flexible Interconnection Protocol for heterogeneous internetworking," Mobile Networks and Applications, vol. 9, no. 4, pp. 347-361, 2004.

[12] K. Babber and R. Randhawa, "A Cross-Layer Optimization Framework for Energy Efficiency in Wireless Sensor Networks," Wireless Sensor Network, vol. 09, no. 06, pp. 189-203, 2017.

[13] S. Deering and R. Hinden, "Internet protocol, version 6 (ipv6) specification," December 1998. [Online]. Available on World Wide Web domain rfc-editor.org at page/info/rfc2460

[14] IEEE, "IEEE Standard for Low-Rate Wireless Networks," IEEE Std 802.15.4-2015 (Revision of IEEE Std 802.15.4-2011), pp. 1-709, April 2016.

[15] M. R. Palattella, N. Accettura, X. Vilajosana, T. Watteyne, L. A. Grieco, G. Boggia, and M. Dohler, "Standardized protocol stack for the internet of (important) things," IEEE Communications Surveys and Tutorials, vol. 15, no. 3, pp. 1389-1406, 2013.

[16] A. Lachenmann, P. J. Marr'on, D. Minder, M. Gauger, O. Saukh, and K. Rothermel, "TinyXXL: Language and runtime support for cross-layer interactions," in Proceedings of the 2006 3rd Annual IEEE Communications Society on Sensor and Adhoc Communications and Networks, Secon 2006, vol. 1, Reston, Va., USA, 2007, pp. 178-187.

[17] P. Levis, S. Madden, J. Polastre, R. Szewczyk, K. Whitehouse, A. Woo, D. Gay, J. Hill, M. Welsh, E. Brewer, and Others, "TinyOS: An operating system for sensor networks," in Weber W., Rabaey J. M., Aarts E. (eds) Ambient intelligence. Berlin, Heidelberg: Springer, 2005, pp. 115-148.

[18] P. J. Marr'on, D. Minder, A. Lachenmann, and K. Rothermel, "Tiny-Cubus: An Adaptive Cross-Layer Framework for Sensor Networks (TinyCubus: Ein Adaptives Cross-Layer Framework f"ur Sensornetze)," it—Information Technology, vol. 47, no. 2, January 2005.

[19] Contiki, "The Open Source OS for the Internet of Things." [Online]. Available on World Wide Web domain contiki-os.org.

[20] K. Roussel and Y.-q. Song, "A critical analysis of Contiki's network stack for integrating new MAC protocols," Ph.D. dissertation, INRIA Nancy, 2015.

[21] Riot, "The friendly Operating System for the Internet of Things." [Online]. Available on World Wide Web domain riot-os.org.

[22] Wikipedia, "Advanced Packaging Tool." [Online]. Available on World Wide Web domain pt.wikipedia.org at page /wiki/Advanced Packaging Tool.

[23] A. Dunkels, "The contikimac radio duty cycling protocol," SICS Technical Report T2011:13, 2011.

[24] MoteIV, "Tmote sky—Low Power Wireless Sensor Module." [Online]. Available on World Wide Web domain github.com at file Vinggui/backup-datasheet/raw/master/tmote-sky-datasheet.pdf.

[25] F. Osterlind, E. Pramsten, D. Roberthson, J. Eriksson, N. Finne, and T. Voigt, "Integrating building automation systems and wireless sensor networks," in Proceedings of the 2007 IEEE Conference on Emerging Technologies & Factory Automation (EFTA 2007), Patras, Greece, 2007, pp. 1376-1379.

[26] Wikipedia, "AA battery." [Online]. Available on World Wide Web domain wikipedia.org at page /wiki/AA battery.

What is claimed is:

1. A method implemented on a processor that is a node in a communications network, the method comprising:
presenting an application programming interface to each of a plurality of protocols in a plurality of different layers of a network communications protocol stack;
preserving in memory a single packet buffer configured to hold headers for all of the plurality of protocols for a packet directed to a first destination node;
storing in memory pointers to tables maintained by the plurality of protocols; and
in response to receiving input at the application programming interface from a first protocol, updating at least one bit in the single packet buffer based on the input and on data in a table maintained by a different second protocol of the plurality of protocols;
wherein the application programming interface is inserted into code for each protocol of the plurality of protocols during compilation of instructions for the protocol stack, whereby original instructions for the protocol stack are configured to be compiled with instructions for the method.

2. The method as recited in claim 1, wherein said updating the at least one bit comprises aggregating data for the first protocol into the packet directed to the first destination node previously constructed for the second protocol.

3. The method as recited in claim 2, wherein said aggregating data for the first protocol comprises indicating a keep alive message for the first protocol.

4. The method as recited in claim 1, wherein the packet directed to the first destination node is a layer 5 application data packet.

5. The method as recited in claim 1, wherein the packet directed to the first destination node is a control packet for layer 2 or layer 3 or layer 4.

6. A non-transitory computer-readable medium carrying one or more sequences of instructions, wherein execution of the one or more sequences of instructions by one or more processors causes the one or more processors to perform the steps of claim 1.

7. An apparatus comprising:
   at least one communication link;
   at least one processor; and
   at least one memory including one or more sequences of instructions, the at least one memory and the one or more sequences of instructions configured to, with the at least one processor, cause the apparatus to perform at least the steps of claim 1.

* * * * *